(12) United States Patent
McDonald et al.

(10) Patent No.: US 11,992,805 B2
(45) Date of Patent: May 28, 2024

(54) HUMIDITY AS A METHOD FOR CONTROLLING CO2 ADSORPTION WITH STEP-SHAPED ADSORBENTS

(71) Applicant: MOSAIC MATERIALS, INC., Alameda, CA (US)

(72) Inventors: Thomas Michael McDonald, Alameda, CA (US); Graham Benjamin Wenz, Alameda, CA (US)

(73) Assignee: MOSAIC MATERIALS, INC., Alameda, CA (US)

( * ) Notice: Subject to any disclaimer, the term of this patent is extended or adjusted under 35 U.S.C. 154(b) by 62 days.

(21) Appl. No.: 17/120,796

(22) Filed: Dec. 14, 2020

(65) Prior Publication Data
US 2021/0178324 A1    Jun. 17, 2021

Related U.S. Application Data

(60) Provisional application No. 62/949,376, filed on Dec. 17, 2019.

(51) Int. Cl.
*B01D 53/62* (2006.01)
*B01D 53/02* (2006.01)
(Continued)

(52) U.S. Cl.
CPC ......... *B01D 53/62* (2013.01); *B01D 53/0462* (2013.01); *B01J 20/226* (2013.01);
(Continued)

(58) Field of Classification Search
None
See application file for complete search history.

(56) References Cited

U.S. PATENT DOCUMENTS

| 2015/0027165 A1 | 1/2015 | Avery et al. |
| 2018/0018541 A1 | 1/2018 | Wang et al. |
| 2018/0272314 A1* | 9/2018 | Long .................... B01D 53/047 |

FOREIGN PATENT DOCUMENTS

| WO | 2013059527 A1 | 4/2013 |
| WO | 2015164543 A1 | 10/2015 |
| WO | 2018152438 A1 | 8/2018 |

OTHER PUBLICATIONS

"Indoor Air Quality Submarines," Persson, O.; Wadso, L., "Proceedings: Indoor Air", 2002.
(Continued)

*Primary Examiner* — Daniel Berns
(74) *Attorney, Agent, or Firm* — CANTOR COLBURN LLP

(57) ABSTRACT

The present disclosure relates to improved solid state sorbent materials and methods for controlling and enhancing carbon dioxide adsorption performance for selected metal-organic framework (MOF) materials. The present disclosure further relates to inventive methods using a novel class of diamine-appended metal-organic frameworks MOF absorbents displaying step-shaped adsorption isotherms with large carbon dioxide capacities. More specifically, the present disclosure relates to diamine-appended MOF materials exhibiting step-shaped adsorption isotherms that are employed in a method utilizing humidity to control and improve carbon dioxide adsorption performance. In addition, the present disclosure relates to diamine-appended MOF materials used in a process including a regeneration step with carbon dioxide and humidity level control to achieve deep carbon dioxide removal even from dilute, near ambient condition carbon dioxide streams as well as more concentrated industrial output streams spanning multiple orders of magnitude. The present disclosure also relates to scrubbing apparatus and methods employing the inventive (Continued)

MOF materials, methods, process steps and apparatus as disclosed to achieve rapid and deeper carbon dioxide capture without the need to pretreat column materials.

11 Claims, 21 Drawing Sheets

(51) Int. Cl.
  *B01D 53/04* (2006.01)
  *B01J 20/22* (2006.01)
  *B01J 20/34* (2006.01)
(52) U.S. Cl.
  CPC ....... *B01J 20/3425* (2013.01); *B01J 20/3466* (2013.01); *B01D 2253/204* (2013.01); *B01D 2257/504* (2013.01)

(56) References Cited

OTHER PUBLICATIONS

"In-Flight Carbon Dioxide Exposures and Related Symptoms: Association, Susceptibility, and Operational Implications," Law, J.; Watkins, S.; Alexander, D., NASA/ TP-2010-216126, Jun. 2010.

"EMU LiOH Life Extension Testing," Peters, B.; Westheimer, D.; Hood, K., "48th International Conference on Environmental Systems," 2018.

"Development Status of Amine-based, Combined Humidity, CO2, and Trace Contaminant Control System for CEV," Nalette, T.; Papale, W.; Smith, F.; Perry, J.,"40th Intl. Conf on Environmental Systems," 2006.

"Direct Capture of CO2 from Ambient Air," Sanz-Perez, E. S.; Murdock, C. R.; Didas, S. A.; Jones, C. W., Chem. Rev. 2016, 116, 11840.

"Cooperative Insertion of CO2 in Diamine-Appended Metal-Organic Frameworks," McDonald, T. M.; Mason, J. A.; Kong, X.; Bloch, E. D.; Gygi, D.; Dani, A .; Crocella, V.; Giordano, F.; Odoh, S.; Drisdell, W.; Vlaisavljevich, B.; Dzubak, A. L.; Poloni, R.; Schnell, S. K.; Planas, M.; Lee, K.; Pascal, T.; Wan, L. F.; Prendergast, D.; Neaton, J. B.; Smit, B.; Kortright, J. B.; Gagliardi, L.; Bordiga, S.; Reimer, J. A.; Long, J. R., Nature 2015, 519, 303.

"A Diaminopropane—Appended Metal-Organic Framework Enabling Efficient CO2 Capture from Coal Flue Gas via a Mixed Adsorption Mechanism," Milner, P. J.; Siegelman, R. L.; Forse, A. C.; Gonzalez, M. 1.; Runcevski, T.; Martell, J. D.; Reimer, J. A.; Long, J. R., J. Am. Chem. Soc., 2017,139, 13541.

"Non-linear waves in chromatography," Helfferich, F. G.; Carr, P. W., Journal of Chromatography, 1993, 629, 97.

* cited by examiner

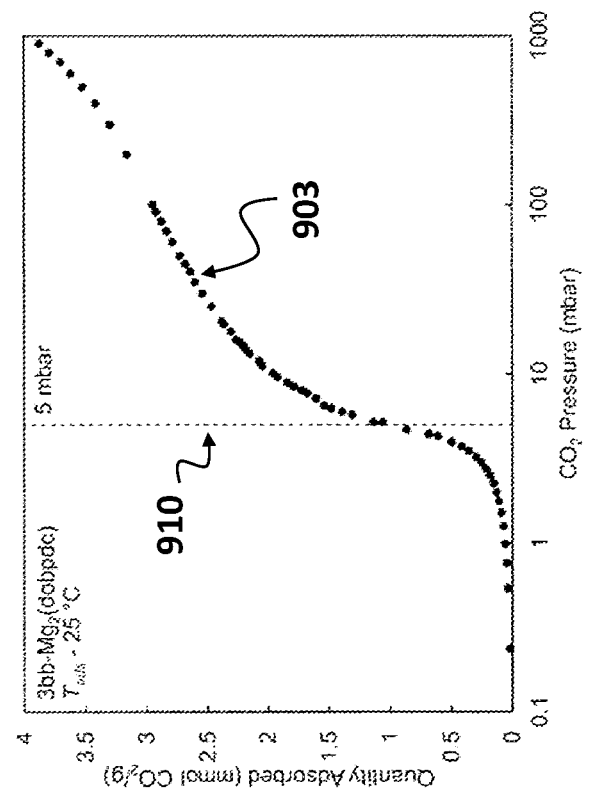
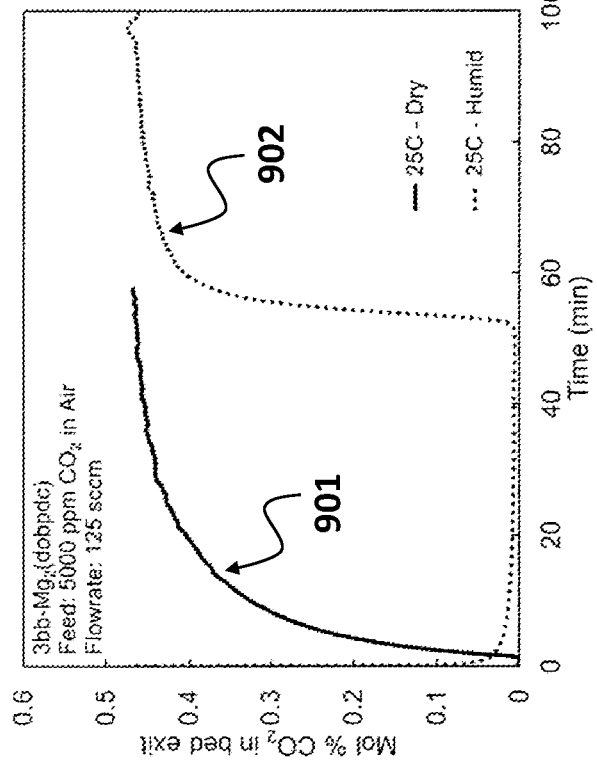
FIG. 9

HUMIDITY AS A METHOD FOR CONTROLLING CO2 ADSORPTION WITH STEP-SHAPED ADSORBENTS

RELATED APPLICATIONS

This present application claims the benefit of priority of U.S. Provisional Patent Application No. 62/949,376 (filed on Dec. 17, 2019), which is hereby incorporated by reference in its entirety.

STATEMENT REGARDING FEDERALLY SPONSORED RESEARCH OR DEVELOPMENT

This invention was made with Government support under N68335-18-C-0728 awarded by the Department of the Navy. The Government has certain rights in this invention.

BACKGROUND OF THE INVENTION

Field of the Invention

This invention relates generally to amine-functionalized solid sorbents based on amine-appended metal-organic frameworks (MOFs) used to remove carbon dioxide gas from effluent streams resulting from industrial and commercial processes in which waste carbon dioxide is otherwise released into the environment. This invention also relates generally to amine-appended MOFs used to control lower levels of carbon dioxide in ambient environments for closed-space life support applications (e.g., submarines and space exploration). The invention relates generally to methods of use and process steps employing the use and control of moisture (water) and humidity (water vapor) levels present (by pre-saturation with water or water vapor) or injected into gaseous input streams to improve deep carbon dioxide removal efficacy of diamine-appended MOFs. The invention further relates to novel MOFs which exhibit step adsorption characteristics that are particularly adapted for use with the various embodied methods and processes of the present disclosure as described hereinbelow.

Description of the Related Art

Removal of carbon dioxide ($CO_2$) from gas streams is ubiquitous across many industrial sectors, with selection of removal technology being driven by the $CO_2$ concentration and the pressure of the feed. While most carbon dioxide removal technologies are deployed in industrial/chemical settings where concentrations vary from 3-50%, there are a number of cases that require carbon dioxide removal from dilute streams. For example, submarine life support applications require maintaining an atmospheric content of less than 0.5% or 5000 ppm $CO_2$ (see "Indoor Air Quality Submarines," Persson, O.; Wadso, L., *"Proceedings: Indoor Air"*, 2002). Similarly, NASA targets maintaining a cabin atmosphere of 2000 ppm or lower for astronauts to prevent unsafe conditions for life and health, and to maintain a high capacity of cognitive function during space exploration missions (see "In-Flight Carbon Dioxide Exposures and Related Symptoms: Association, Susceptibility, and Operational Implications," Law, J.; Watkins, S.; Alexander, D. *NASA/TP*-2010-216126, June 2010). For a solid-sorbent based life support system, the adsorbent performance is the primary determinant of system weight, size, and capabilities.

Single pass adsorbents strongly adsorb carbon dioxide through the interaction of highly basic hydroxide groups with carbon dioxide to form carbonate (and bicarbonate species in the presence of water). This interaction is highly exothermic, and thus the energy required to reverse the reaction makes in-situ regeneration impractical. The primary benefit of hydroxide adsorbents is the low molar mass of the material, such that one kilogram of material can theoretically capture its weight in carbon dioxide, although capacities closer to 30 wt. % are typical. Furthermore, hydroxide-based adsorbents perform well in the presence of water and thus do not require complex system designs such as a pretreatment step (see "EMU LiOH Life Extension Testing," Peters, B.; Westheimer, D.; Hood, K., "48*th* *International Conference on Environmental Systems,"* 2018).

In addition to dilute carbon dioxide removal from breathable air, considering carbon dioxide concentrations an order of magnitude lower to ~400 ppm corresponds to ambient air levels. Removing carbon dioxide from ambient air for harvesting, sequestration or utilization is also known as direct air capture (DAC) and has become an active area of research by many for climate change mitigation. Together DAC and life support can be thought as a separation challenge for removing trace amounts of carbon dioxide from air, albeit at different concentrations, and both applications differ significantly from traditional industrial or chemical separations. Owing to the low concentration of carbon dioxide in ambient air and the atmospheres in confined spaces, large amounts of air must be processed to remove meaningful amounts of carbon dioxide. Another commonality between DAC and life support is the presence of humidity, whether it be from ambient conditions or a result of metabolic function. While there are various approaches for carbon dioxide removal from air (both breathable and ambient), regenerable solid-sorbent systems have emerged as an attractive method for dilute carbon dioxide removal from air, but existing systems still exhibit poor performances.

There are a few different classes of solid sorbents capable of adsorbing dilute carbon dioxide, with the most widely used class being amine-functionalized solid adsorbents because the presence of strongly basic amine groups within pores endows the materials for selectivity for carbon dioxide even in the presence of water (see "Direct Capture of $CO_2$ from Ambient Air," Sanz-Perez, E. S.; Murdock, C. R.; Didas, S. A.; Jones, C. W., *Chem. Rev.,* 2016, 116, 11840). Amine impregnated silica materials have been investigated for life-support, and display many promising characteristics (for examples see "Development Status of Amine-based, Combined Humidity, $CO_2$, and Trace Contaminant Control system for CEV," Nalette, T.; Papale, W.; Smith, F.; Perry, J., Chap. "40*th Intl. Conf on Environmental Systems,"* 2006). However, compared to single-pass adsorbents, significant improvements in the gravimetric capacity of regenerative adsorbents is highly desired for cost-effective and efficient real applications. While traditional amine-functionalized solids are a functional technology for removing dilute carbon dioxide from humid ambient or breathable air, they demonstrate relatively modest working capacities. These low working capacities lead to increased energy and time requirements for regeneration of large system sizes.

Accordingly, what is needed are more effective materials that can absorb ranges of carbon dioxide from low ambient levels typical of enclosed life support systems to industrial applications where the levels are significantly higher. Thus, one object of the present invention is the selection, use and control of amine-functionalized solid sorbents for the improved removal of carbon dioxide across several orders of magnitude of concentration from near ambient conditions (e.g., naturally occurring levels) to industrial levels where the carbon dioxide is present at levels in excess of 10,000 ppm. A further object of the present invention is the selection, use and control of amine-appended metal-organic framework (MOFs) absorbents for the improved removal of carbon dioxide across several orders of magnitude of concentration from near ambient conditions (e.g., naturally occurring levels) to industrial levels where the carbon dioxide is present at levels in excess of 10,000 ppm.

SUMMARY OF THE INVENTION

In accordance with the above objects and those that will be mentioned and will become apparent below, one object embodiment of the present disclosure is the use of amine-functionalized solid sorbents in the presence of humidity to better control the adsorption of trace and higher levels of carbon dioxide. Another object and embodiment of the present disclosure are amine-appended metal-organic framework (MOFs) materials that are tunable with the use of moisture (humidity) to control the absorption of carbon dioxide over several orders of magnitude of carbon dioxide concentrations in gaseous streams including air, nitrogen, natural gas, oxygen, industrial effluents and commercial emissions. Yet another object and embodiment of the present disclosure is a process employing the control of relative humidity in treatment of a gaseous stream to achieve deep (near quantitative) carbon dioxide removal.

Another further object and embodiment of the present disclosure is a means for activating amine-appended MOFs using moisture in a gas stream (pre-saturation using water or water vapor) to control the carbon dioxide adsorption characteristics of a packed treatment bed of particulate MOF materials with improved flow rates and higher carbon dioxide retention. Another object and embodiment of the present disclosure is the use of humidity to enhance the performance of amine-appended MOFs and enable the control of the relative rates of carbon dioxide and water propagation through a packed treatment bed of particulate amine-appended MOF materials, by maintaining an optimum relative humidity level. Yet another object and embodiment of the present disclosure is the selection of amine-appended MOFs that exhibit step adsorption characteristics that are most suitably tuned by the use of pre-saturation and subsequent control of humidity in a gas stream to maximize performance of the materials in removing ambient $CO_2$ at low concentrations from air and other gases. Yet another object and embodiment of the present disclosure are processes and methods of using the inventive materials disclosed in a device or apparatus in the form of a packed bed to treat gaseous emissions and ambient environments to remove carbon dioxide in the presence of water or humidity. A further object and embodiment of the present disclosure are processes and methods of using the inventive materials disclosed in a device or apparatus in the form of a packed bed using humidity to treat ambient environments with closed-space life support (e.g., submarines and space exploration) needs to remove extremely low levels (dilute) carbon dioxide in the presence of water and humidity. Yet a further object and embodiment of the present disclosure is the use of the inventive MOF materials in a simplified process that does not require the pretreatment of column materials prior to a treatment or removal step enabling faster and more efficient carbon dioxide removal with fewer steps. Another object and embodiment of the present disclosure is the use of a vacuum-temperature swing adsorption (VTSA) techniques to regenerate a packed bed of MOF materials to remove captured water and carbon dioxide and refresh the adsorbent for a subsequent and repeated carbon dioxide capture events.

One embodiment of the present invention includes a method for removing $CO_2$ from an effluent gas stream, the method following the steps of first (a) contacting the effluent gas stream with an adsorption material to reversibly adsorb $CO_2$ from the effluent gas stream thereby generating an adsorption material with improved $CO_2$ capacity; wherein the adsorption material is an amine-functionalized solid sorbent comprising an amine-appended metal-organic framework composed of a plurality of (i) amine-containing ligands; (ii) polytopic organic linkers; and (iii) metal ions; wherein the amine-functionalized solid sorbent is present in the form of a packed bed of solids selected from particles, granules, films, agglomerates thereof, and combinations thereof; wherein the improved $CO_2$ capacity is achieved by means of pre-saturating the amine-functionalized solid sorbent using water vapor prior to contact with the effluent gas stream; and then (b) removing a portion of the $CO_2$ from the effluent gas stream; and finally (c) retaining a portion of the $CO_2$ on the amine-functionalized solid sorbent prior to a regeneration process to renew the adsorption material.

In yet another embodiment of the present invention, the amine ligand is selected from diamines including, but not limited to ethylene diamine, N-methylethylenediamine, N-ethylethylenediamine ("e2"), N,N-dimethylethylenediamine, N,N-diethylethylenediamine, di(N-methyl)ethylene diamine, N-isopropylethylenediamine ("i2"), N,N-dimethyl-N-methylethylene diamine, di(N,N-dimethyl)ethylene diamine, N,N-diisopropylethylene diamine, 2,2-dimethyl-1,3-diaminopropane ("3bb"), 1,3-diaminopentane ("3ae"), and combinations thereof. In yet other related embodiments, the amine ligand is selected from triamine compounds including, but not limited to diethylenetriamine, iV-(2-aminoethyl)-1,3-propanediamine, bis(3-aminopropyl)amine, N-(3-aminopropyl)-1,4-diaminobutane, triethylenetetramine, N,N'-bis(2-aminoethyl)-1,3-propanediamine, 1,2-bis(3-aminopropylamino)ethane, N,N'-bis(3-aminopropyl)-1,3-propanediamine, N,N'-bis(3-aminopropyl)-1,4-diaminobutane, tetraethylenepentamine, and combinations thereof. In yet other related embodiments, the amine ligand is selected from an amine-alcohols. All of these disclosed amine ligands feature a basic amine functional group, which acts to coordinate (append) to the material framework. In related embodiments, the polytopic organic linker is selected from 4,4'-dihydroxy-(1,1'-biphenyl)-3,3'-dicarboxylic acid, its deprotonated mono-carboxylate form, its di-carboxylate form, and combinations thereof; and the metal ions are cationic metal ions selected from Mg, Ca, Mn, Cr, Fe, Co, Ni, Cu, Zn, and combinations thereof. In yet other embodiments, the polytopic organic linker may be selected from 4,4'-dioxidobiphenyl-3,3'-dicarboxylate (dobpdc), 4,4"-dioxido-[1,1':4',1"-terphenyl]-3,3"-dicarboxylate (dotpdc), 2,5-dioxidobenzene-1,4-dicarboxylate (dobdc), 3,3'-dioxide-biphenyl-4,4'-dicarboxylate (para-carboxylate-dobpdc) and combinations thereof, including their partially and fully deprotonated carboxylate forms.

In a further embodiment of the present invention, the adsorption material is pre-saturated by first introducing water to the adsorption material in the form of water vapor introduced by means of injecting a neutral carrier gas with the water vapor to achieve a higher relative humidity level than the incident neutral carrier gas prior to the injection of water, resulting in enhanced performance of the adsorption material as disclosed herein.

In yet another embodiment of the present invention, the adsorption material is saturated by the continuous introduction of water to the absorption material in the form of water vapor introduced by means of injecting the water vapor into the effluent gas stream prior to contact with the adsorption material to achieve a higher relative humidity level than the effluent gas stream prior to the injection of water, an approach that maintains the preferred initial relative humidity level within the adsorption material, yet allows the relative humidity level to be changed to a more optimum level during actual processing of a gaseous stream as velocity, temperature, adsorption kinetics and other factors are changed or optimized.

In a further embodiment of the present invention, the humidity level within the adsorption material is maintained at an optimum level during usage by continuously monitoring the relative humidity level of the treated effluent gas stream and adjusting the humidity level to the optimum level by means of a method selected from (a) changing the temperature of effluent gas stream; (b) changing the temperature of the adsorption material, (b) injecting water vapor to the effluent gas stream, (c) removing water vapor from the effluent gas stream; (d) changing the velocity of the effluent gas stream, (e) increasing the rate of $CO_2$ propagation by increasing the concentration of $CO_2$, (f) decreasing the rate of $CO_2$ propagation by decreasing the concentration of $CO_2$, (g) increasing the rate of $H_2O$ propagation by increasing the concentration of $H_2O$, (h) decreasing the rate of $H_2O$ propagation by decreasing the concentration of $H_2O$, and combinations thereof, these methods enabling flexibility in the control of the adsorption kinetics and desorption kinetics for the purpose of increasing the amount and depth of carbon dioxide retention when desired, and then enabling the release of carbon dioxide for the purpose of regeneration of the adsorption material for subsequent process events.

In one embodiment of the present invention, the adsorption material is synthesized by the method comprising grafting a plurality of the polyamine-containing ligands onto a metal-organic framework, wherein the metal-organic framework comprises a plurality of metal cations and a plurality of polytopic organic linkers, wherein the grafting comprises exposing an amount of the metal-organic framework to a solution comprising the polyamine ligand diluted with a solvent thereby forming unactivated adsorption material. The resulting solid adsorption material then can be processed into the form of particles, aggregates and agglomerates and combinations thereof to produce the adsorption material with desired physical attributes relating to particle size, porosity, packing efficacy, bed formation, stability and such other factors required for use.

For the description of this present invention, an "unactivated" material refers to a material that has residual solvent, water, oxygen gas, nitrogen gas, other gases naturally present in ambient air, and carbon dioxide residing within the porous structure of the material. In this "unactivated" state said material has no capacity or selectivity towards adsorption of water, CO2 or any other gases or components as the active sites for adsorption are filled or passivated.

Furthermore, for the present description an "activated" material refers to a state in which the components residing in an "unactivated" material that has been removed through a treatment process. This treatment process, commonly referred to as "activation" can be accomplished through heating to an elevated temperature(s) under active vacuum, flowing inert atmosphere, or combinations of the three conditions. The time needed under activation conditions will widely vary upon material, selected temperature(s), atmosphere (active vacuum vs. flowing inert gas). The resulting material will have unoccupied/active adsorption sites, preparing it for use in a gas separation or treatment process.

For the current description, a "primed" material refers to an adsorption material that has been activated for adsorption but has been treated in another manner in preparation for exposure to a gas stream with $CO_2$ for selective adsorption in a gas separation or treatment process.

In further embodiments of the present invention, the process step of pre-saturating the adsorption material using water vapor prior to contacting the effluent gas stream results in primed adsorption material exhibiting at least one improvement in performance relative to the unactivated adsorption material wherein the improvement is selected from (i) an increased $CO_2$ capacity, (ii) increased gas velocity at constant $CO_2$ capacity, (iii) depth of $CO_2$ adsorption, and combinations thereof.

In yet further embodiments of the present invention, at least one improvement in performance relative to the activated adsorption material is achieved by maintaining an optimum level of relative humidity within the adsorption material during dynamic contact with an effluent gas stream.

In embodiments of the present invention, the optimum level of relative humidity entering or present within the adsorption material with respect to the water vapor is between 10 to 100% relative humidity, or alternatively with respect to the water present on the amine-functionalized solid sorbent, a amount of water corresponding to between 0.35 and 3.5 mole percent $H_2O$ (water).

In yet another embodiment of the present invention, there is described a method for removing $CO_2$ from a gaseous environment by means of direct air capture, involving the steps of first (a) exposing an adsorption material to the gaseous environment to reversibly adsorb $CO_2$ from the gaseous environment; wherein the adsorption material is an amine-functionalized solid sorbent comprising a amine-appended metal-organic framework composed of a plurality of (i) amine-containing ligands; (ii) polytopic organic linkers; and (iii) metal ions; wherein the amine-functionalized solid sorbent is present in the form of an open bed of solids selected from particles, granules, films, agglomerates thereof, and combinations thereof; wherein the improved $CO_2$ capacity is achieved by means of pre-saturating the amine-functionalized solid sorbent using water vapor prior to exposure to the gaseous environment; and then (b) removing a major portion of the $CO_2$ from the gaseous environment; and finally (c) retaining the major portion of the $CO_2$ on the amine-functionalized solid sorbent prior to a regeneration process to renew the adsorption material.

In related embodiments of the present invention involving direct air capture or the use of an open bed of adsorption materials, the adsorption material may be pre-saturated by first introducing water to the adsorption material in the form selected from liquid water, water vapor, steam, ambient relative humidity, and combinations thereof to achieve a relative humidity level within the adsorption material that is at least equal to or greater than the equilibrium relative humidity level of the gaseous environment.

In further related embodiment of the present invention, the pre-saturation step using some form of water results in at least one improvement in performance relative to the activated adsorption material is achieved by maintaining an optimum level of relative humidity within the adsorption material during contact with the gaseous environment.

Alternatively, in yet a further embodiment of the present invention, the step of pre-saturating the adsorption material using water vapor prior to contacting the effluent gas stream results in a primed adsorption material exhibiting at least one improvement in performance relative to the unactivated adsorption material wherein the improvement is selected from (i) an increased $CO_2$ capacity, (ii) increased gas velocity at constant $CO_2$ capacity, (iii) depth of $CO_2$ adsorption, and combinations thereof.

In another embodiment of the present invention, presaturation and the maintenance of some degree of relative humidity results in at least one improvement in performance relative to the activated adsorption material, and is achieved by maintaining an optimum level of relative humidity in the gaseous environment by either introducing water to or removing water from the gaseous environment in contact with the adsorption material.

In related embodiments of the present invention involving a step that either introduces or removes water from the gaseous environment or the adsorption material itself, the optimum level of relative humidity with respect to the water vapor is between 10 to 100% relative humidity, or alternatively expressed, the optimum level of relative humidity with respect to the water present on the amine-functionalized solid sorbent corresponds to between 0.35 and 3.5 mole percent $H_2O$.

In some embodiments of the present invention the optimum level of relative humidity is controlled by means of either (a) increasing or (b) decreasing the temperature of the adsorption material in contact with the gaseous environment, while in other embodiments, the optimum level of relative humidity is controlled by means of either (c) increasing or (d) decreasing the flow rate of the gaseous environment in contact with the adsorption material, and combinations thereof, the steps (a)-(d) being done in any order and for any time period required to optimize the desired characteristic of the adsorption material.

In yet further embodiments of the present invention, where the adsorption material is regenerated in a repeatable cyclic process, the cyclic process involves the steps of (a) adsorbing $CO_2$ from either an effluent gas stream or gaseous environment; (b) regenerating the adsorbent material using at least one step of applying heat to the adsorbent material, heating the effluent gas stream, heating an inert gas stream, applying vacuum to the adsorbent material, and combinations thereof to release adsorbed carbon dioxide and water; (c) flowing an inert gas stream containing water vapor over the adsorption material or contacting the adsorption material with water, water vapor or combinations thereof to achieve an optimum level of relative humidity; and (d) repeating steps (a)-(c) until acceptable extraction has been achieved.

Further features and advantages of the present invention will become apparent to those of ordinary skill in the art in view of the detailed description of preferred embodiments below, when considered together with the attached Figures and Tables.

BRIEF DESCRIPTION OF THE DRAWINGS

The foregoing aspects and others will be readily appreciated by the skilled artisan from the following description of illustrative embodiments when read in conjunction with the accompanying drawings.

FIG. 9(A) shows a representative plot of dynamic gas breakthrough of 5000 ppm $CO_2$ in air on 3bb-$Mg_2$(dobpdc) with and without humidity at 1.5 mol % water (~50% RH); (B) shows a pure component $CO_2$ adsorption isotherm at 25° C. on 3bb-$Mg_2$(dobpdc) with dotted line at 5 mbar 5000 ppm $CO_2$ partial pressure.

These and other objects and advantages of the present invention will become more fully apparent from the following description taken in conjunction with the accompanying drawings. Reference will now be made to the drawings wherein like numerals refer to like parts throughout.

DETAILED DESCRIPTION

Figure 1:
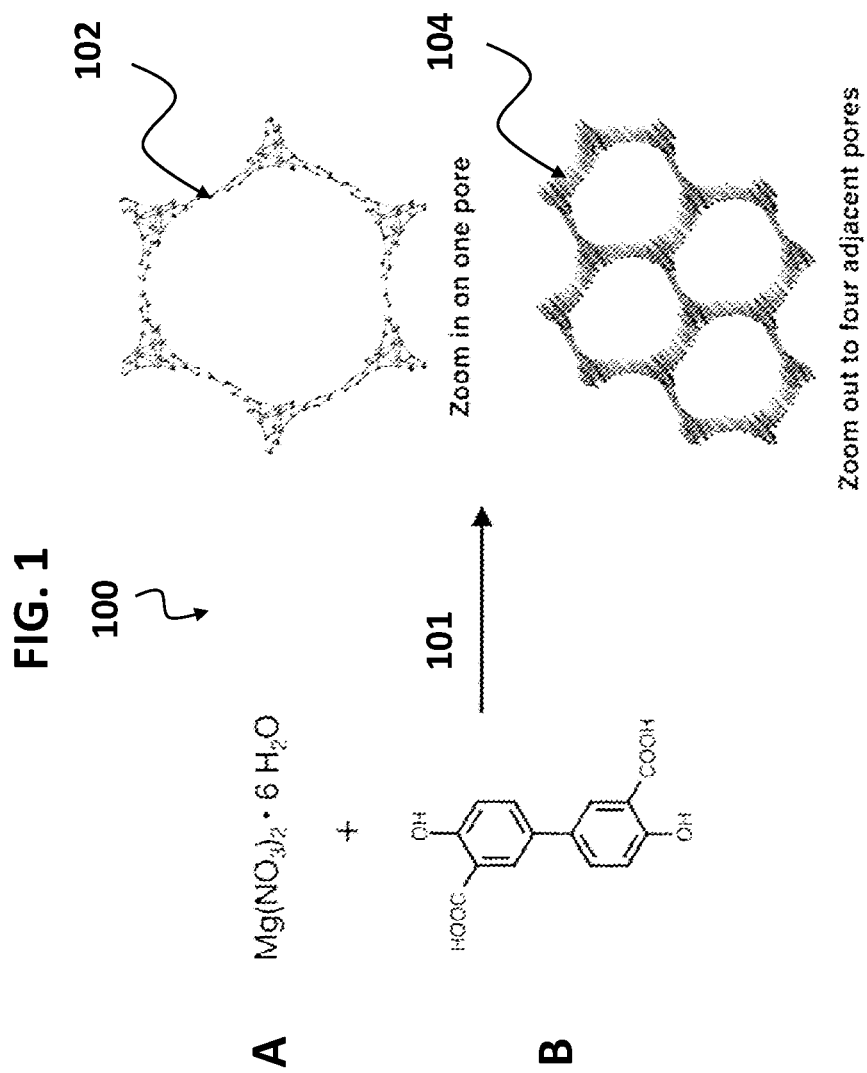
FIG. 1 shows a schematic representation of the primary components of one embodiment of a metal-organic framework (MOF) according to the present invention utilizing a magnesium salt and an organic linker (polytopic linker) to form a resulting porous structure as shown.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application were specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentage ("%'s") are in weight percent (based on 100% active) of the total composition. When parts per million are used, it is understood that this corresponds to a weight/weight or volume/volume ratio as appropriate. Unless otherwise stated, amounts listed in mole or millimoles/g present a molar to weight ratio of the first respective component present in the second component, being water or gas on adsorbent material.

As used herein, the term "relative humidity" (RH) refers to the relative amount of moisture (water) present in air or a gas or an effluent stream in the form of water vapor at a given temperature and pressure.

It will be appreciated that the methods disclosed herein may vary as to the specific steps and sequence, and the apparatus may vary as to structural details without departing from the basic concepts as disclosed herein. The method steps are merely exemplary of the order that these steps may occur. The steps may occur in any order that is desired, such that it still performs the goals of the claimed technology as disclosed herein in various exemplary embodiments described in the specification below and the accompanying Figures and Tables.

Metal Organic Frameworks

Metal-organic frameworks (MOFs) are crystalline solids composed of organic molecules that employ metal ions to create an infinitely repeating scaffold that is porous on the molecular scale and have emerged as a promising class of solid sorbents for a variety of gas separation techniques.

While the primary examples in this present inventive disclosure relate to the removal of carbon dioxide from gas streams in order to show the necessary conditions, steps and processes to enable the performance of the inventive materials, it is to be appreciated that the compositions and methods disclosed herein relate in general to improved carbon dioxide capture whose applications include: removing $CO_2$ from outside air; removing $CO_2$ from air people breath; removing $CO_2$ as a greenhouse gas from the emissions of industrial process and power plants; removing $CO_2$ from natural gas; removing $CO_2$ from oxygen; use in sensors for detecting the presence of $CO_2$; using the heat of adsorption for making heat; and the use of the adsorbents as a heat pump.

FIG. 1 shows a schematic (100) of one inventive embodiment of the composition and skeletal structure of the inventive MOFs (102) useful for the inventive methods of use as disclosed herein, owing to their extended pore system as shown magnified (104). (see "Cooperative Insertion of $CO_2$ in Diamine-Appended Metal-Organic Frameworks," McDonald, T. M.; Mason, J. A.; Kong, X.; Bloch, E. D.; Gygi, D.; Dani, A.; Crocella, V.; Giordano, F.; Odoh, S.; Drisdell, W.; Vlaisavljevich, B.; Dzubak, A. L.; Poloni, R.; Schnell, S. K.; Planas, M.; Lee, K.; Pascal, T.; Wan, L. F.; Prendergast, D.; Neaton, J. B.; Smit, B.; Kortright, J. B.; Gagliardi, L.; Bordiga, S.; Reimer, J. A.; Long, J. R., *Nature*, 2015, 519, 303.) The MOFs proposed herein are readily produced through a simple solvothermal synthesis procedure (101) as exampled in one embodiment schematically in FIG. 1 wherein a suitable metal cationic salt, such as for example in one embodiment, a magnesium salt ("A", magnesium nitrate hexahydrate) and a selected polytopic organic linker ("B", here 4,4'-dihydroxy-(1,1'-biphenyl)-3,3'-dicarboxylic acid or its deprotonated mono- or di-carboxylate form) are mixed in an aqueous solution, wherein the reagents self-assemble to form a robust skeletal structure with a plurality of receptive pores shown schematically in 102 and 104. Other suitable polytopic organic linkers include, but are not limited to 4,4'-dioxidobiphenyl-3,3'-dicarboxylate (dobpdc), 4,4"-dioxido-[1,1':4',1"-terphenyl]-3,3"-dicarboxylate (dotpdc), 2,5-dioxidobenzene-I, 4-dicarboxylate (dobdc), 3,3' dioxide-biphenyl-4,4'-dicarboxylate (para-carboxylate-dobpdc) and combinations thereof.

Figure 2:
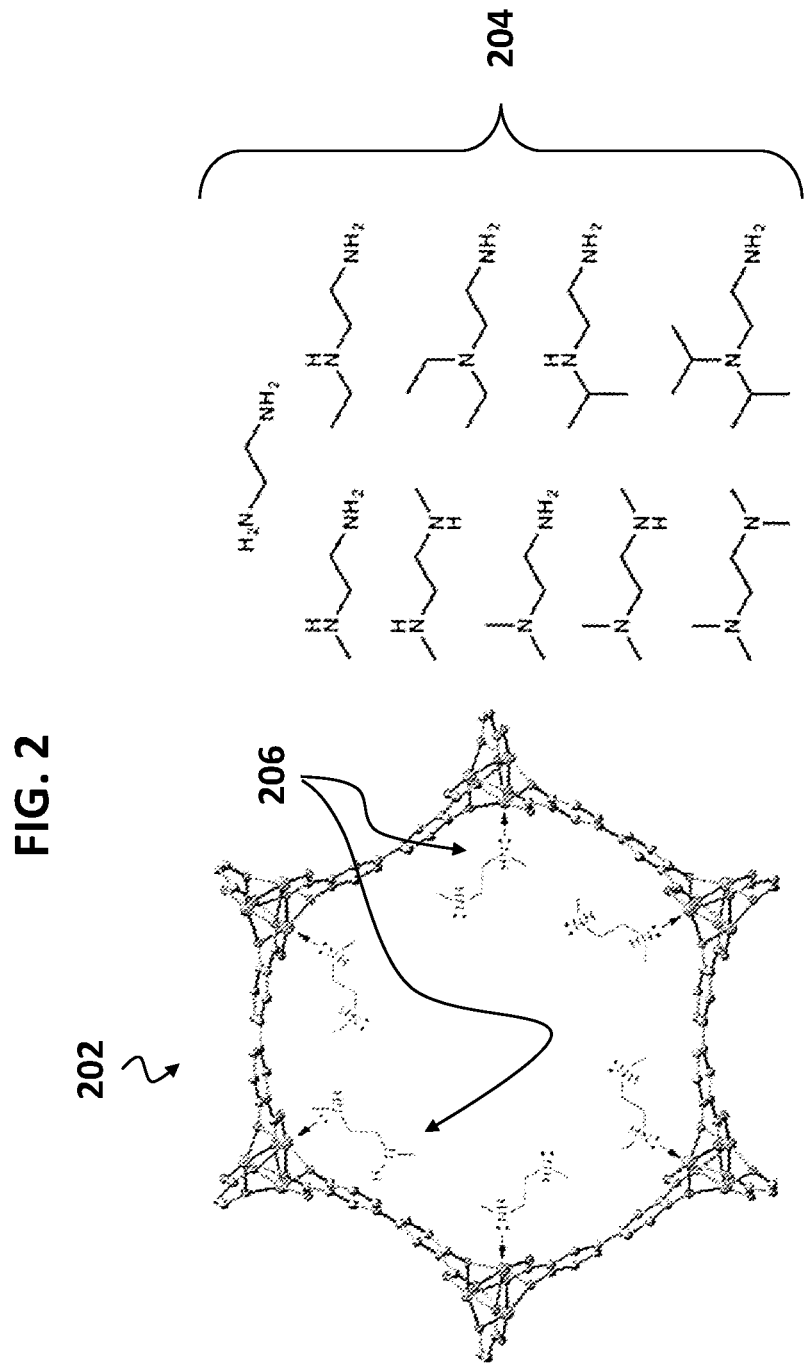
FIG. 2 illustrates multiple embodiments of diamine molecules (ligands) that can be attached to specific metal sites within MOF skeletons generating materials that interact strongly with $CO_2$ to produce a library of effective compounds.

FIG. 2 illustrates how a variety of suitable polyamine ligands, here diamine molecules (204) can be attached to specific sites within these MOF skeletons (202), generating materials that interact strongly with carbon dioxide through the attached amine moieties (206). The metal ions in the MOF structure have only five of their six molecular binding sites coordinated to the organic polytopic organic linker, leaving a coordination site available to bind to one amine each of the attached diamine ligand. This facile synthesis approach allows for a library of materials to be generated. In the inventive embodiment shown in FIG. 2, the attached amine moieties (206) represent a metal MOF (202) with the formula designation of $M_2$(dobpdc), where M is a suitable metal, selected from, but not limited to Mg, Mn, Fe, Co, and Zn, and the organic moiety is denoted "dobpdc4" which corresponds to 4,4'-dioxidobiphenyl-3,3'-dicarboxylate. In general, the adsorption material is synthesized by the method comprising grafting a plurality of the diamine ligands onto a metal-organic framework, wherein the metal-organic framework comprises a plurality of metal cations and a plurality of polytopic organic linkers, wherein the grafting comprises exposing an amount of the metal-organic framework to a solution comprising the polyamine (diamine) ligand diluted with a solvent thereby forming unactivated adsorption material. Subsequent treatments using elevated temperatures, application of active vacuum, flowing of an inert gas, and combinations thereof remove residual species resulting in an activated adsorption material. Subsequent treatment using water, water vapor and the application of gaseous streams having water present in the form of water vapor represented as percent relative humidity (% RH) then primes the herein disclosed MOF materials, and the subsequent drying and re-exposure of the MOF materials enables cycling and recycling of the adsorbent MOFs between an inactive and primed state. Other suitable polyamine ligands include triamine compounds including, but not limited to diethylenetriamine, iV-(2-aminoethyl)-1,3-propanediamine, bis(3-aminopropyl)amine, N-(3-aminopropyl)-1,4-diaminobutane, triethylenetetramine, N,N'-bis(2-aminoethyl)-1,3-propanediamine, 1,2-bis(3-aminopropylamino)ethane, N,N'-bis(3-aminopropyl)-1,3-propanediamine, N,N'-bis(3-aminopropyl, and combinations thereof.

Adsorbents of the structure shown in FIG. 2 adsorb carbon dioxide via a mechanism unique to this material class, which without being bound by theory, is believed to involve a novel step-wise cooperative binding mechanism. The novel mechanism of these inventive adsorbents is the primary technology differentiator because it engenders this class of materials with unique and advantageous adsorption properties. This "cooperative" mechanism for carbon dioxide binding causes the uptake of the $CO_2$ as a function of pressure to follow a step function rather than the traditional linear or proportional binding modes known to date (ibid, McDonald, Nature 2015, 519, 303). A step is best described as a discontinuity in the adsorption isotherm (relationship of $CO_2$ adsorption quantity and $CO_2$ pressure at constant temperature). Cooperative adsorbents yielding a stepped isotherm can be further described by the slopes (first derivative) of the isotherm shape where the slope of the isotherm decreases before the step, but at the step point the value of the positive first derivative suddenly increases. After the step ends, the slope of the isotherm resumes an expected decrease with increasing pressure. This contrasts with the more gradual increase in carbon dioxide loading that is characteristic of other carbon dioxide adsorbents where the isotherm slope (first derivative) is always positive and the value decreases monotonically as pressure is increased from low to high pressure. Because of this, only a small change in pressure or temperature is needed to fully load or unload carbon dioxide from the novel adsorbents and embodiments thereof presented herein, significantly increasing the working capacity of the adsorbent and, as shown below, reducing the energy needed for adsorbent regeneration.

While there is some research and development regarding amine-functionalized MOF adsorbents displaying step-shaped carbon dioxide adsorption isotherms through varying amine-metal combinations, to date there is no evidence of using water as a method for controlling solid sorbent performance under dilute carbon dioxide conditions. The unique class of amine-appended MOF adsorbents and related inventive embodiments disclosed herein display enhanced performance for dilute carbon dioxide removal under humid conditions, compared to dry conditions. Furthermore, this performance is heavily dependent upon the inlet water concentration (e.g., relative humidity), providing an alternative method for controlling cyclic adsorbent performance with significantly improved carbon dioxide uptake efficacy.

Materials and Methods

Figure 3:
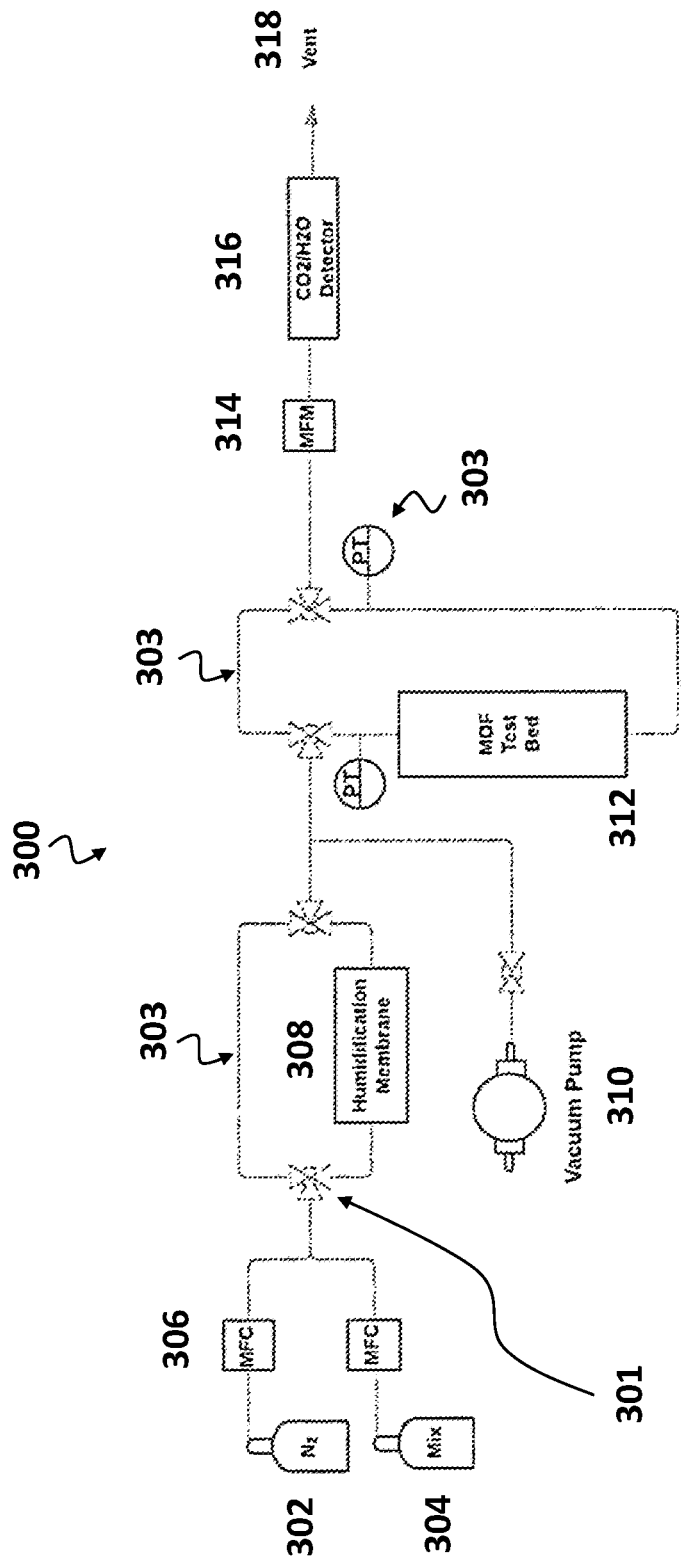
FIG. 3 shows a schematic diagram of one embodiment of a dynamic flowing gas breakthrough apparatus for testing diamine-appended MOF adsorbents under dry and humid conditions.

Dynamic gas breakthrough measurements were used to evaluate the performance of diamine-appended MOF adsorbents under dry and humid conditions. FIG. 3 is a schematic of one embodiment of an experimental test apparatus used for the dynamic, flowing gas measurements to characterize the impact of humidity on adsorbent performance. Because of the complexity of amine-metal-organic framework, amine-$CO_2$, and amine-$H_2O$ interactions and their interdependence, dynamic flowing gas experimental testing is the most appropriate way to evaluate performance of amine-appended MOFs under humid dilute carbon dioxide gas streams.

FIG. 3 shows one embodiment of a schematic dynamic, flowing gas breakthrough apparatus 300 in which nitrogen gas (302) and/or mixed gas (304), after suitable passage though MFC (mass flow controller)(306) that are used control and provide stable gas injection rates and is then then passed in one embodiment either directly to the MOF test bed (312) through the bypass line 303 or in a second embodiment subjected to humidity control by first passing through a humidification membrane 308 to achieve the desired relative humidity or water content. A vacuum pump 310 can be engaged prior to or after each experimental run to purge the lines and dehumidify 308 as needed for subsequent processes. The vacuum pump 310 can also be employed in further embodiments of the present disclosure to perform one or a plurality of vacuum-temperature swing adsorption (VTSA) cycles, as described hereinbelow. A plurality of three-way control valves 301 enable changing the flow path of the process apparatus 300. The mixed gas (304) can be used as delivered or be volumetrically proportionated with the nitrogen gas 302 supply in order to adjust the initial level of carbon dioxide present in the inflowing upstream gas mixture to a desired level. After optional humidification, the flowing gas mixture (302 and 304) can either be injected into the MOF test bed 312 or sampled using the second bypass line 303 to the detection portion of the inventive apparatus, which consists of a mass-flow meter ("MFM", 314) to measure flow rates upstream of a combined carbon dioxide/water detector (316) which is then vented through vent 318. In addition, in one embodiment of the present disclosure, pressure transducers (PT, 303) located upstream and downstream of the MOF test bed 312 are included to enable monitoring of pressure differential over the MOF test bed 312.

Dynamic breakthrough measurements were made on a custom-built test apparatus according to one embodiment of the present disclosure corresponding to FIG. 3, utilizing pure amine-appended MOF granules sieved between 20 and 40 U.S. mesh size, to minimize pressure drop through the bed. Typical columns of adsorbent utilized about 400 mg of sieved MOF adsorbent loaded into a ¼"OD (outer diameter) stainless steel column with an average bed depth of about 17 cm. In general, the diamine-appended MOFs may be utilized in particle or granular form, or aggregated forms of particles and granules that are suitable for open-bed configurations for Direct Air Contact treatment of ambient environments or alternatively other solid forms and sizes suitable for packing into columns for treating effluent gas under dynamic (flow or forced flow) conditions. When employed in a column, the larger particle and granular forms and aggregates thereof provide a tortuous path for effectively treating an effluent gas, the packing density, particle size and configuration of the column all being adjustable parameters that may be optimized to provide for good flow, acceptable pressure drop and appropriate contact time to enable intimate contact between the diamine-appended MOFs and the effluent gas or gaseous environment desired to be treated for carbon dioxide removal. Accordingly, in other embodiments, particle sizes of particles, aggregates and agglomerates thereof may effectively range between particle size corresponding to between 3.5 and 500 U.S. Mesh sizes, the number representing an average particle size as retained on the selected screen mesh size.

To demonstrate the impact of water on the carbon dioxide adsorption performance of amine-appended $Mg_2$(dobpdc) MOFs, a small number of select diamine ligands were identified to provide preliminary structure-performance relationships. Table 1 below summarizes the chemical name, structure and abbreviation used for each diamine used to create diamine-functionalized MOFs used in this disclosure. The base MOF structure for embodiments of the present disclosure are represented as $Mg_2$(dobpdc), "dobpdc" being equivalent to 4,4'-dioxidobiphenyl-3,3'-dicarboxylate. However, similar results are expected for the broader family of $M_2$ (dobpdc) materials wherein M is any suitable metal cation selected from, but not limited to Mg, Mn, Fe, Co and Zn and the corresponding MOF frameworks formed with any amine-MOF combination yielding the desired step-shaped $CO_2$ adsorption isotherms according to the present disclosure (ibid, McDonald, *Nature*, 2015, 519, 303 67). Furthermore, similar results are expected for a broader family of amine-appended MOFs where the functional group appended to the MOF structure contains any number of amine functional groups, with varying substituents.

TABLE 1

Name, structure and abbreviation for diamines appended to the base $Mg_2$(dobpdc) framework presented herein.

| Diamine Name | Structure | Abbreviation |
|---|---|---|
| 2,2-dimethyl-1,3-diaminopropane | $H_2N$—C($CH_3$)$_2$—$NH_2$ | 3bb |
| N-ethylethylenediamine | CH$_3$CH$_2$—NH—CH$_2$CH$_2$—$NH_2$ | e2 |
| N-isopropylethylenediamine | (CH$_3$)$_2$CH—NH—CH$_2$CH$_2$—$NH_2$ | i2 |
| 1,3-diaminopentane | $H_3C$—CH$_2$—CH(NH$_2$)—CH$_2$—$NH_2$ | 3ae |

Water as a Method to Improve Carbon Dioxide Capture Under Dilute Conditions

When separating carbon dioxide from an incident stream including water there are several enhancements that arise from the addition of water to the incident stream. Below outlines the different ways water can be leveraged to enhance $CO_2$ adsorption with amine-appended MOF adsorbents displaying step-like adsorption isotherms.

Significant Increases in Carbon Dioxide Capacity Under Humid Conditions

It is well documented that water either marginally improves or maintains the carbon dioxide adsorption performance of traditional amine-based solid sorbents. (ibid, McDonald, *Nature*, 2015, 519, 303 67; Sanz-Perez, *Chem. Rev.* 2016, 116, 11840; and "A Diaminopropane-Appended Metal-Organic Framework Enabling Efficient $CO_2$ Capture from Coal Flue Gas via a Mixed Adsorption Mechanism" Milner, P. J.; Siegelman, R. L.; Forse, A. C.; Gonzalez, M. 1.; Runcevski, T.; Martell, J. D.; Reimer, J. A.; Long, J. R., *J. Am. Chem. Soc.*, 2017, 139, 13541).

However, addition of water to the incident stream (pre-saturation) for amine-appended MOF adsorbents enables higher carbon dioxide capacities, as measured under dynamic breakthrough conditions. The first example of this can be seen in FIG. 4 below, where addition of water to a stream of 5000 ppm $CO_2$ in air increased the saturation capacity from 2.59 to 3.67 mmol $CO_2$/g, reflected by the increased time to $CO_2$ breakthrough (rapid increase in carbon dioxide concentration at the bed exit). This >40% capacity increase is particularly attractive for low-$CO_2$ content (e.g., <1% $CO_2$) streams, where traditional solid sorbents tend to have low adsorption capacities. Improvements in cyclic $CO_2$ loadings can enable smaller, more efficient removal systems.

Figure 4:
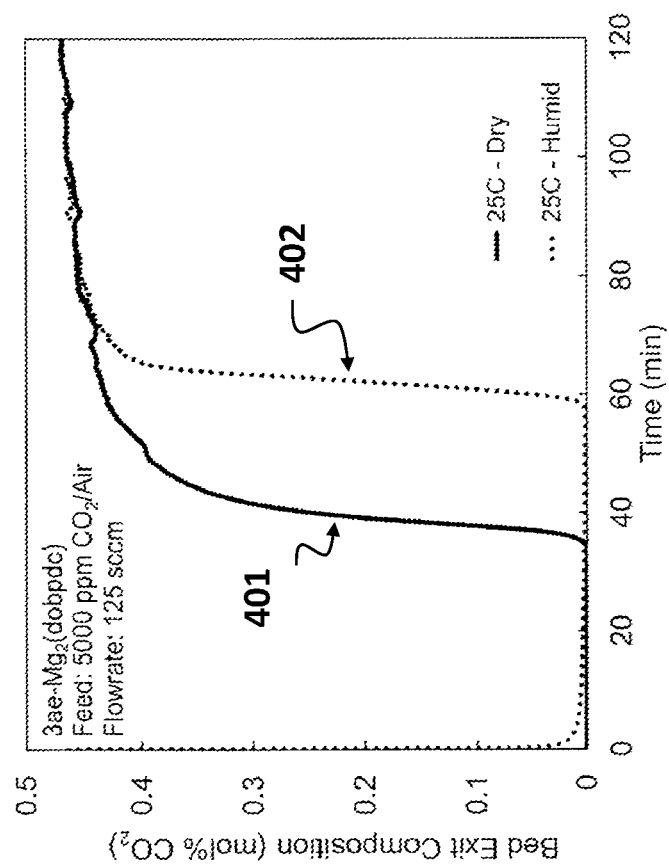
FIG. 4 shows a representative plot of dynamic gas breakthrough of 5000 ppm $CO_2$ in air on 3ae-$Mg_2$(dobpdc) with and without humidity at 1.5 mol % water (~50% RH).

FIG. 4 shows the results of one embodiment of a dynamic gas breakthrough of 5000 ppm $CO_2$ in air on 3ae-$Mg_2$(dobpdc) with either humidity at 1.5 mol % water (~50% RH) present (402) and in the absence of humidity (401), with all other parameters held constant, using a flow rate of 125 sccm (standard cubic centimeters per minute, a flow measurement term indicating cm$^3$/min in standard conditions for temperature and pressure of a fluid). The plot shows two traces graphed by time (min) versus Bed Exit Composition of the effluent in mol % $CO_2$. These results illustrate the significantly improved carbon dioxide retention achieved by embodiments of the present disclosure when humidity is injected into the effluent gas stream prior to MOF exposure.

Enhanced Adsorption Kinetics

Another advantage a humid incident stream provides for adsorbents with step-shaped carbon dioxide adsorption is enhanced adsorption kinetics. The enhancement of carbon dioxide adsorption kinetics was not apparent in the 3ae-$Mg_2$(dobpdc) analogue shown in FIG. 4 herein, as the sharp carbon dioxide front demonstrate sufficiently fast carbon dioxide adsorption kinetics under both dry and humid testing conditions. The ability for water to enhance the kinetics of carbon dioxide adsorption is best displayed when considering an amine-appended MOF adsorbent with slow adsorption kinetics, such as the i2-$Mg_2$(dobpdc) shown in FIG. 5. Examining the performance of adsorption of 2000 pm $CO_2$ in $N_2$ (nitrogen gas) with a bed superficial velocity of 125 cm/min (corresponding to a 20 sccm feed rate through a ¼" OD bed) i2-$Mg_2$(dobpdc) displays deep $CO_2$ removal with (approximately)~200 ppm $CO_2$ "slipping" through the bed. As time progresses, reported as bed volumes of gas processed, carbon dioxide is continually adsorbed until ultimate saturation of the bed occurs resulting in a rapid increase in carbon dioxide concentration in the bed exit. Increasing the gas superficial velocity from 125 cm/min to 800 cm/min has a marked impact on carbon dioxide adsorption performance; the "slip" of carbon dioxide through the bed increases to >800 ppm (nearly half the feed concentration) with a slow increase of carbon dioxide concentration at the bed exit. Considering the structure of the "i2" diamine compared to "3ae" (see Table 1), the bulky isopropyl group may hinder the rate at which the diamine ligands rearrange during the $CO_2$—metal insertion mechanism of the cooperative adsorption.

Figure 5:
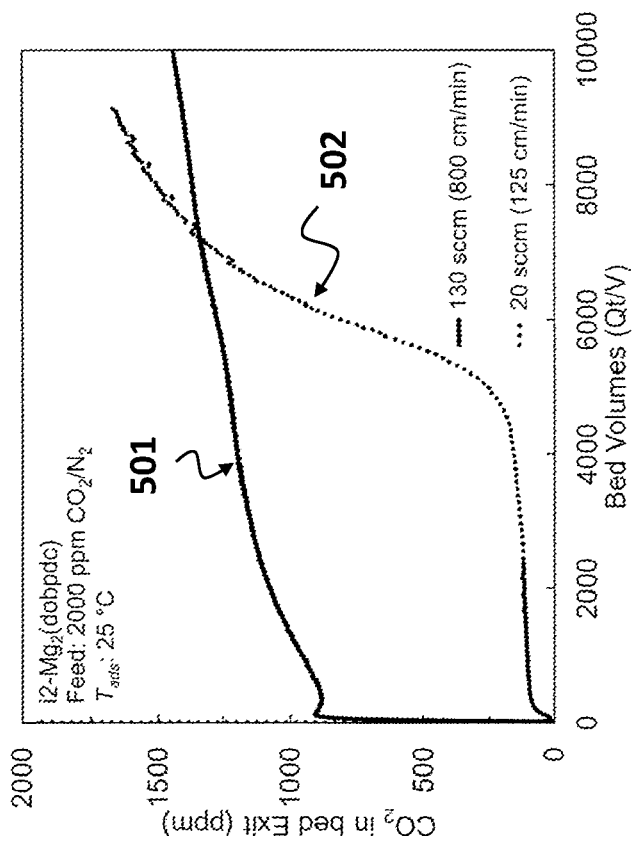
FIG. 5 shows a representative plot of dynamic gas breakthrough of dry 2000 ppm $CO_2$ in $N_2$ on i2-$Mg_2$(dobpdc) at two different feed flow rates demonstrating slow adsorption kinetics under dilute $CO_2$ concentrations.

FIG. 5 is a plot of the Bed Exit Composition of the effluent in ppm $CO_2$ versus the bed volume in relative units of Qt/V or flow rate/retention volume. FIG. 5 shows an example embodiment of dynamic gas breakthrough of dry 2000 ppm $CO_2$ in $N_2$ on i2-$Mg_2$(dobpdc) at two different feed flow rates demonstrating the slow adsorption kinetics under dilute $CO_2$ concentrations. At high flow rates of about 130 sccm (501) $CO_2$ retention is poor, while under reduced flow rates of 20 sccm (about 125 cm/min) (502) $CO_2$ retention is significantly improved.

Figure 6:
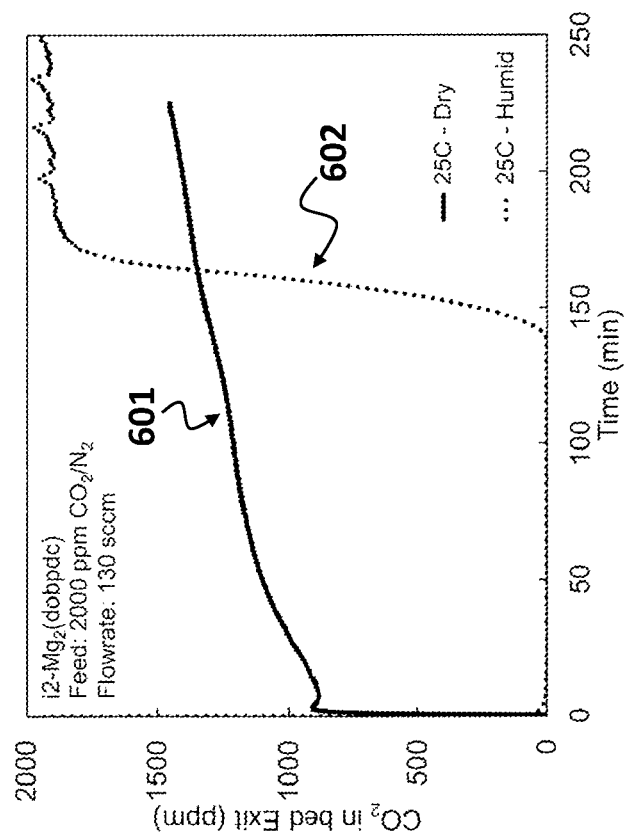
FIG. 6 shows a representative plot of dynamic gas breakthrough of 2000 ppm $CO_2$ in $N_2$ on i2-$Mg_2$(dobpdc) with and without humidity at 1.5 mol % water (~50% RH).

While i2-$Mg_2$(dobpdc) displays slow adsorption kinetics under dry conditions with high gas superficial velocities, addition of water to the incident stream (injection) results in a significant increase in adsorption performance, as shown in FIG. 6 where the performance of i2-$Mg_2$(dobpdc) under 2000 ppm $CO_2$ in $N_2$ with (trace 602) and without humidity (trace 601) is reported. FIG. 6 shows one embodiment of the present disclosure wherein dynamic gas breakthrough of 2000 ppm $CO_2$ in $N_2$ on i2-$Mg_2$(dobpdc) is compared between dry and humid incident gas streams.

Figure 7:
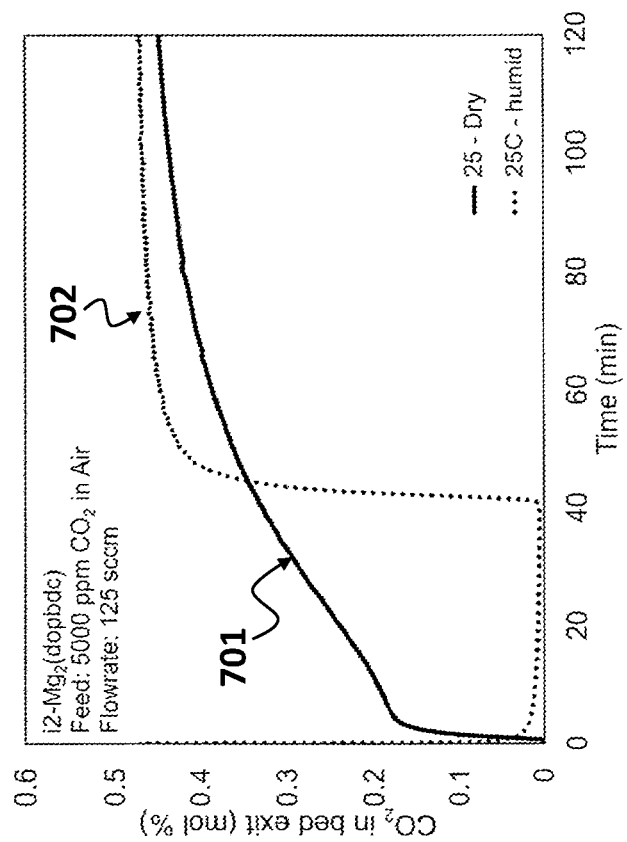
FIG. 7 shows a representative plot of dynamic gas breakthrough of 5000 ppm $CO_2$ in air on i2-$Mg_2$(dobpdc) with and without humidity at 1.5 mol % water (~50% RH).

The addition of water not only facilitates rapid carbon dioxide adsorption, but water reduces the level of carbon dioxide "slippage" through the bed. This performance is not limited to this specific case of 2000 ppm $CO_2$ in $N_2$, as similar performance is realized under 5000 ppm $CO_2$ in air conditions as shown in FIG. 7. FIG. 7 illustrates one embodiment of the present disclosure used to treat 5000 ppm $CO_2$ in air on i2-$Mg_2$(dobpdc) with humidity at 1.5 mol % water (~50% RH)(trace 702) and without humidity (trace 701) present.

Examining another diamine-MOF combination for dilute carbon dioxide capture, e2-$Mg_2$(dobpdc), extends the notion that humidity can be used as a method for increasing adsorption kinetics and capacity under dilute carbon dioxide conditions. Like the 3ae- and i2-$Mg_2$(dobpdc) analogues, addition of humidity to the incident stream increases capacity and kinetics. It should be noted that the flowrate of the e2-Mg2(dobpdc) experiments was at a significantly higher superficial velocity of 1850 cm/min, showing this characteristic is applicable to a wide range of carbon dioxide and water concentrations, amine-MOF combinations and gas separation process conditions.

Figure 8:
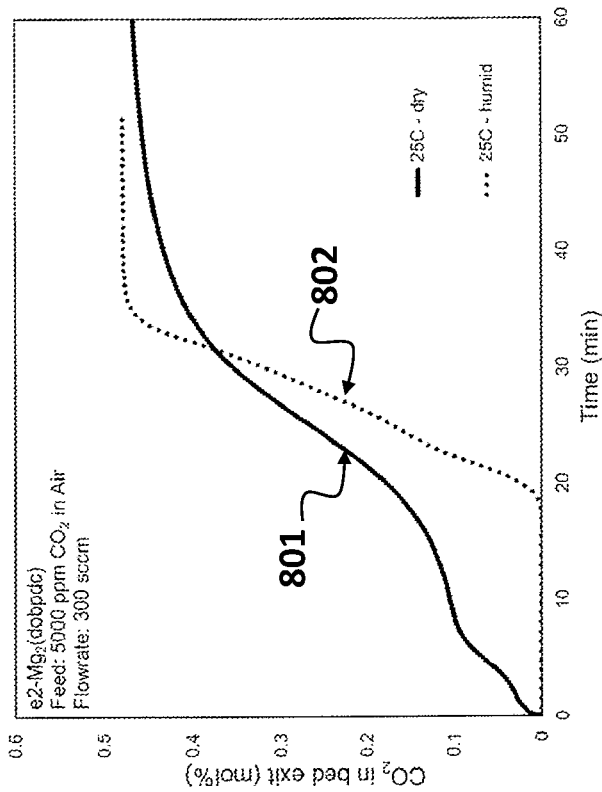
FIG. 8 shows a representative plot of dynamic gas breakthrough of 5000 ppm $CO_2$ in air on e2-$Mg_2$(dobpdc) with and without humidity at 1.5 mol % water (~50% RH).

FIG. 8 shows another inventive embodiment of the dynamic gas breakthrough of 5000 ppm $CO_2$ in air on an e2-$Mg_2$(dobpdc) material with 1.5 mol % water (~50% RH)(802) present and without humidity (801), at a slightly higher relative flow rate of 300 sccm.

Deepening Step of Adsorbents

In addition to enabling higher capacities and faster adsorption kinetics under dilute carbon dioxide conditions, water enhances performance through an apparent deepening of the carbon dioxide adsorption step position. For example, shown in FIG. 9 the equilibrium volumetric isotherms (right panel A) for 3bb-Mg2(dobpdc) show that under 5000 ppm $CO_2$ concentration, a maximum of approximately 0.9 mmol/g capacity is predicted under equilibrium conditions. Dry, dynamic dilute breakthrough measurements demonstrate almost instantaneous carbon dioxide breakthrough (901), with a minimal amount of carbon dioxide removed. Under these conditions a $CO_2$ capacity of 0.6 mmol/g was recorded, slightly under the predicted capacity from equilibrium isotherms. However, with the addition of humidity to the incident gas stream 3bb-$Mg_2$(dobpdc) achieves deep carbon dioxide removal (trace 902) with a capacity of 3.6 mmol/g, approaching the equilibrium capacity of this material at partial pressures, an order of magnitude higher than in the absence of humidity. This performance enhancement from water enables a wider range of applicability for the present inventive embodiments of the disclosed diamine-framework combinations that would not have been apparent from single component equilibrium isotherms. This further illustrates the novelty and unexpected results from employing the methods of use of the amine-modified MOF materials disclosed herein with humidity control to maximize carbon dioxide retention.

FIG. 9 B (right panel) shows the pure component $CO_2$ adsorption isotherm at 25° C. on 3bb-$Mg_2$(dobpdc) (trace 903) with the vertical dotted line (910) representing the point of 5 mbar/5000 ppm $CO_2$ partial pressure, noting that the carbon dioxide pressure axis is in logarithmic form.

Performance Under Dilute Carbon Dioxide Concentrations

Addition of water into $CO_2$-containing gas streams has an impact on the performance of $CO_2$-selective adsorbents with step-shaped isotherms. With the three performance enhancements mentioned above (higher capacity, faster adsorption kinetics and deeper adsorption steps) characterizing materials and methods of use of embodiments of the present disclosure, the role of water provides a novel method for controlling and improving carbon dioxide adsorption performance. However, depending upon the application/incident gas stream there could be varying levels of water content (i.e., humidity). This is particularly true in the cases of dilute carbon dioxide capture in the life support arena, where changes in ambient temperature and exertion of occupants in closed environments can have significant impacts on the resulting humidity and carbon dioxide levels the adsorbent will be exposed to. To investigate the impact of water content in dilute carbon dioxide streams, several water content and adsorption temperature combinations were investigated to demonstrate the ability of water to augment carbon dioxide adsorption performance of adsorbents with step-shaped adsorption isotherms.

Figure 10:
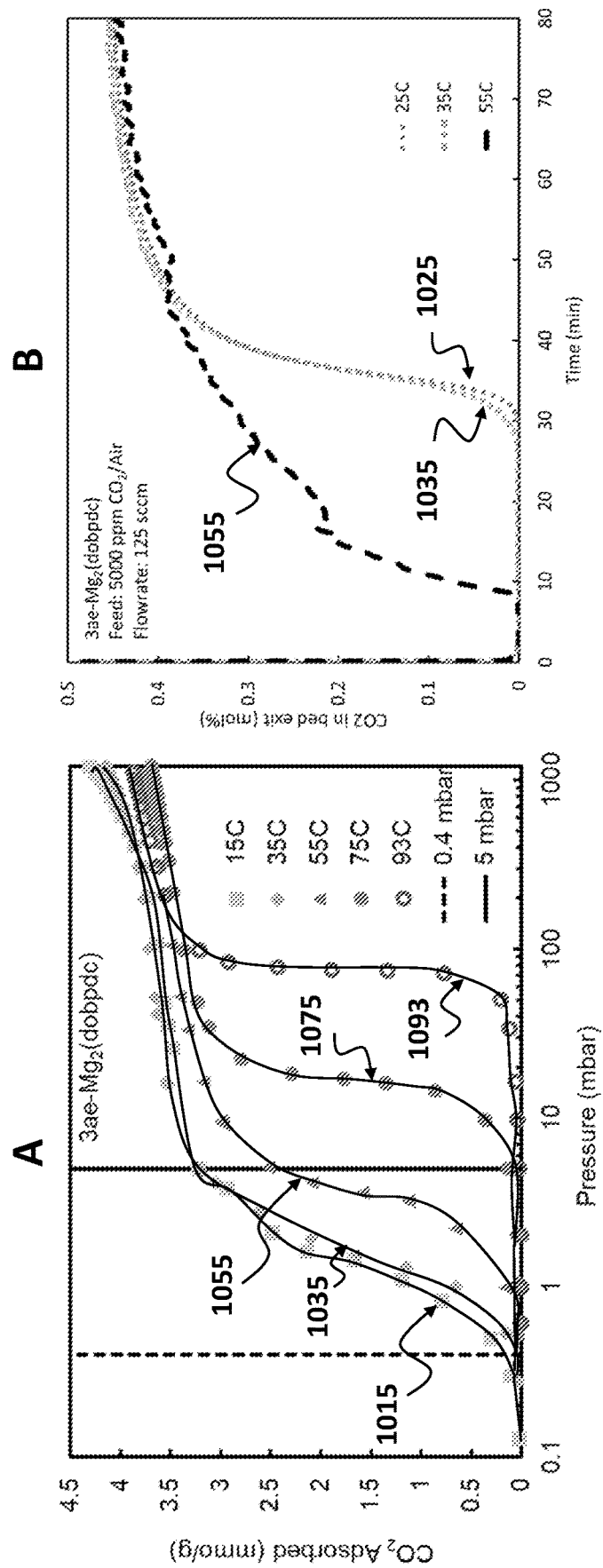
FIG. 10 (A) shows a representative plot of pure component adsorption isotherm of $CO_2$ on 3ae-$Mg_2$(dobpdc) at various temperatures; (B) shows a representative plot of dynamic gas breakthrough of 5000 ppm $CO_2$ in air on 3ae-$Mg_2$(dobpdc) at different temperatures.

Accordingly, to benchmark effects of water content in the incident streams, the dry performance of 3ae-$Mg_2$(dobpdc) for adsorbing 5000 ppm $CO_2$ in air at three different temperatures is shown in the right panel (B) of FIG. 10. The lower temperature cases (25° C., trace 1025 and 35° C., trace 1035) demonstrate minor differences in carbon dioxide adsorption performance; both cases lead to a saturation capacity of 2.2 mmol/g $CO_2$ capacity. While these capacities are lower than the measured equilibrium loadings from single component isotherms (see FIG. 10A), this discrepancy is likely rooted in the dynamic evaluation conditions used, where a high superficial gas velocity may be limiting a small portion of adsorption performance compared to the static, equilibrium isotherm measurement. Increasing adsorption temperature to 55° C. results in a reduced capacity of 1.6 mmol/g, manifesting itself as a reduced breakthrough time (trace 1055). The higher temperature of 55° C. was selected as it shifts the location of the adsorption step close to the 5 mbar (millibar) partial pressure carbon dioxide of interest as shown by the second solid vertical line in panel A; increasing the temperature higher would push the step location past the 5 mbar zone, resulting in essentially zero carbon dioxide adsorption capacity as seen at temperatures of 75 and 93° C.

FIG. 10 panel A shows the pure component adsorption isotherms of $CO_2$ on 3ae-$Mg_2$(dobpdc) at various temperatures at 15° C. (1015, baseline), 35° C. (trace 1035), 55° C. (trace 1055), 75° C. (trace 1075) and at 93° C. (trace 1093).

To evaluate the impact of water at different adsorption temperatures, three water (humidity) levels were explored. These correspond to 25%, 50% and 75% relative humidity (RH) at 25° C., however as RH is highly dependent upon temperature, these were translated to mol % and kept constant across various adsorption temperatures. The impact of dynamic flowing carbon dioxide adsorption performance from a 5000 ppm $CO_2$ in air stream at varying water levels at 25° C. is reported in FIG. 11, with tabular results presented in Table 2. Although not shown, improvements in adsorption efficiency are expected with as low as 10% relative humidity (RH). Although saturation occurs around 100% RH, it is also believed that this higher level can provide improvements as well, although humidity is also related to the temperature of the gas, so that various RH/T ratios are effective as well over a range of temperatures and relative humidity values.

The amount of water in the incident stream has a significant impact on the resulting carbon dioxide adsorption performance, where increasing the content at an adsorption temperature of 25° C. leads to complex dynamic carbon dioxide adsorption performance. However, increasing the water content past 50% RH (or 1.5 mol %) has little impact on the ultimate capacity of carbon dioxide it has a marked impact on the carbon dioxide evolution in the dynamic adsorption performance. Specifically, 1.5 mol % water (Plot C) and 2.4 mol % water (Plot D) content resulted in a $CO_2$ uptake of 3.6 mmol/g MOF but with significant differences in breakthrough profiles; the lower water content stream (1.5 mol %) lead to a sharp shock of $CO_2$ to ~3000 ppm, with a slow wave before a second shock to 5000 ppm $CO_2$ indicating bed saturation. Increasing the water content to 2.4 mol % resulted in a similar elution profile, however the initial shock was at a lower concentration (about 2000 ppm) with a short wave before a second shock indicating saturation. Tracking the evolution profile of water as shown in FIG. 11 panels A-D suggests that as the elution times of carbon dioxide and water become closer, these complicated breakthrough profiles emerge.

Figure 11:
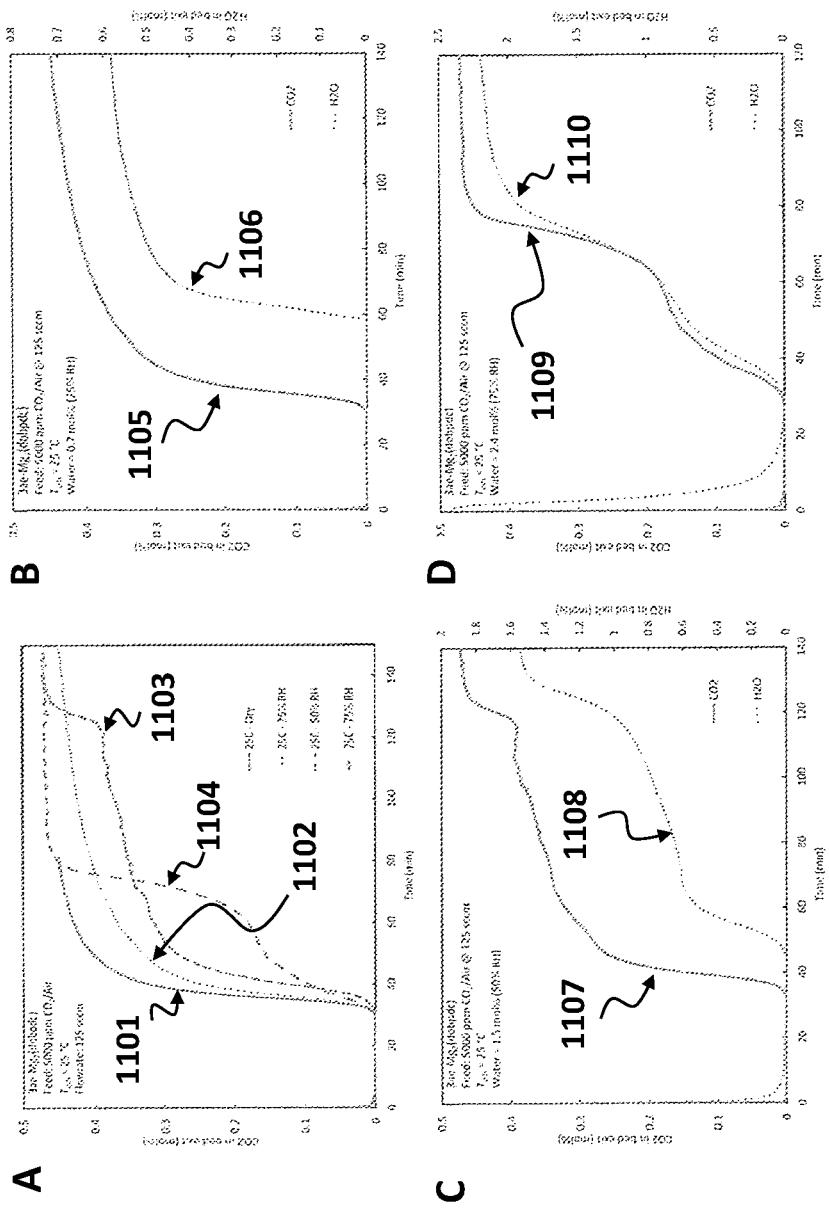
FIG. 11 (A-D) shows a representative plot of dynamic gas breakthrough of 5000 ppm $CO_2$ in air on 3ae-$Mg_2$(dobpdc) at 25° C. with varying water levels.

FIG. 11 panel A shows the more complex behavior comparison of representative embodiments of the disclosure with dynamic gas breakthrough of 5000 ppm $CO_2$ in air on 3ae-$Mg_2$(dobpdc) at 25° C. with varying water levels differing from none (dry, trace 1101) to 25% RH (trace 1102), 50% RH (trace 1103) and at 75% RH (trace 1104). Panels B, C and D show the corresponding breakthrough times of carbon dioxide (1105, 1107 and 1109) and water (1106, 1108 and 1110) at the approximately equivalent water levels shown in Panel A, respectively.

With respect to the molar equivalency of the amount of water present at acceptable levels of relative humidity between 10 to 100% RH, the optimum level of relative humidity with respect to the water present on the amine-functionalized solid sorbent corresponds to between 0.35 to 3.5 mole percent $H_2O$ (mol % $H_2O$). In the embodiments shown in FIG. 11, the relative humidity range tested corresponds to between about 0.7 to 2.4 mol % water

TABLE 2

Results of $CO_2$ and water capacities for dry and humid dynamic gas breakthrough of 5000 ppm $CO_2$ in air on 3ae-$Mg_2$(dobpdc) at 25° C. with varying water levels along with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}/v_{H2O}$ |
| --- | --- | --- | --- | --- | --- |
| 25° C. - dry | 2.23 | — | 0.29 | — | — |
| 25° C. - 25% RH (0.7 mol % $H_2O$) | 3.21 | 5.84 | 0.20 | 0.15 | 1.33 |
| 25° C. - 50% RH (1.5 mol % $H_2O$) | 3.58 | 15.56 | 0.18 | 0.12 | 1.5 |
| 25° C. - 75% RH (2.4 mol % $H_2O$) | 3.61 | 16.34 | 0.18 | 0.19 | 0.95 |

To better understand the role of simultaneous adsorption of water and carbon dioxide in a fixed bed processes it is illustrative to consider the velocity of the pure components as they progress down the column of adsorbents (see "Non-linear waves in chromatography" Helfferich, F. G.; Carr, P. W., *Journal of Chromatography*, 1993, 629, 97). Assuming ideal chromatography conditions, where the particles of water and carbon dioxide are in local equilibrium with the solid adsorbent, the loading of a particle $q_i$ can be described as a function of the adsorbate concentration $c_i$, yielding:

$$v_{ci} \cong \frac{v_o}{1 + \frac{\rho}{\varepsilon} \frac{\partial q_i}{\partial c_i}} \qquad \text{Eq. 1}$$

where $v_o$ is the mobile phase (gas stream) velocity, $\rho$ (rho) is the adsorbent bulk density, $\varepsilon$ (epsilon) is bed void fraction, $(\partial q_i/\partial c_i)$ is the slope of the equilibrium isotherm of component i at concentration $c_i$, and $q_i$ is the instantaneous equilibrium isotherm of component i. The velocity, $v_{ci}$, is the rate a concentration of component i would travel through a fixed bed process when the mobile and solid phases are in equilibrium, called the "natural" wave velocity. From inspection it holds that the steeper the isotherm the lower the natural wave velocity, suggesting that step-shaped isotherms should yield sharp breakthrough profiles.

However, in non-linear chromatography, where the slope of the isotherm is variable (i.e., not constant), there is a difference between particle and wave velocities. The particle velocity is the average velocity of a distinct, identifiable object whereas the wave velocity is of a given value of a variable. Assuming a particle will only advance down the fixed bed at the moving phase velocity, and only when in the moving phase (i.e., immobile adsorbate), the particle velocity depends upon the slope of the chord of the isotherm corresponding to that component, yielding the simplified expression:

$$v_{ci} \cong \frac{v_o}{1 + \frac{\rho}{\varepsilon} \frac{q_i}{c_i}} \qquad \text{Eq. 2}$$

Assuming ideal gas behavior applies under the conditions tested, this allows for approximating the average velocity that carbon dioxide and water travel through the fixed bed of adsorbent from experimentally measured capacities. Results of this analysis for the 25° C. adsorption case are presented in Table 2, where there is a trend between relative component velocities and the resulting breakthrough performance. Examining the breakthrough results suggests that complex adsorption behavior occurs when the relative component velocities are approximately equal. Without being bound by theory, this suggests competitive adsorption behavior of carbon dioxide and water during simultaneous removal if the component fronts are traveling at the same rate. Therefore, controlling the reaction (residency) rates at which carbon dioxide and/or water travel through the fixed bed process provides another inventive means for controlling cyclic adsorption behavior in another inventive embodiment of this disclosure.

As described above, carbon dioxide adsorption in the amine-appended MOF adsorbents occurs through a cooperative adsorption mechanism where the carbon dioxide inserts into the metal—amine bond leading to the step-shaped adsorption isotherm. Without being bound by theory, it is believed that adsorption of water is through a more classical mechanism, with a combination of interactions of intermolecular forces between water and the diamine-appended framework. Thus, carbon dioxide and water adsorption will have different temperature dependencies. As shown in FIG. 10, there is negligible difference in the carbon dioxide adsorption of 5000 ppm $CO_2$ in air at 25° C. and 35° C. as a result of the chemisorptive nature of cooperative adsorption. However, it is expected that water adsorption will decrease with increasing temperature allowing for independent control of water and carbon dioxide adsorption within this class of materials. The results of dynamic flowing gas carbon dioxide adsorption performance of 5000 ppm $CO_2$ in air from varying water content streams is shown in FIG. 12, with corresponding data summarized in Table 3.

Figure 12:
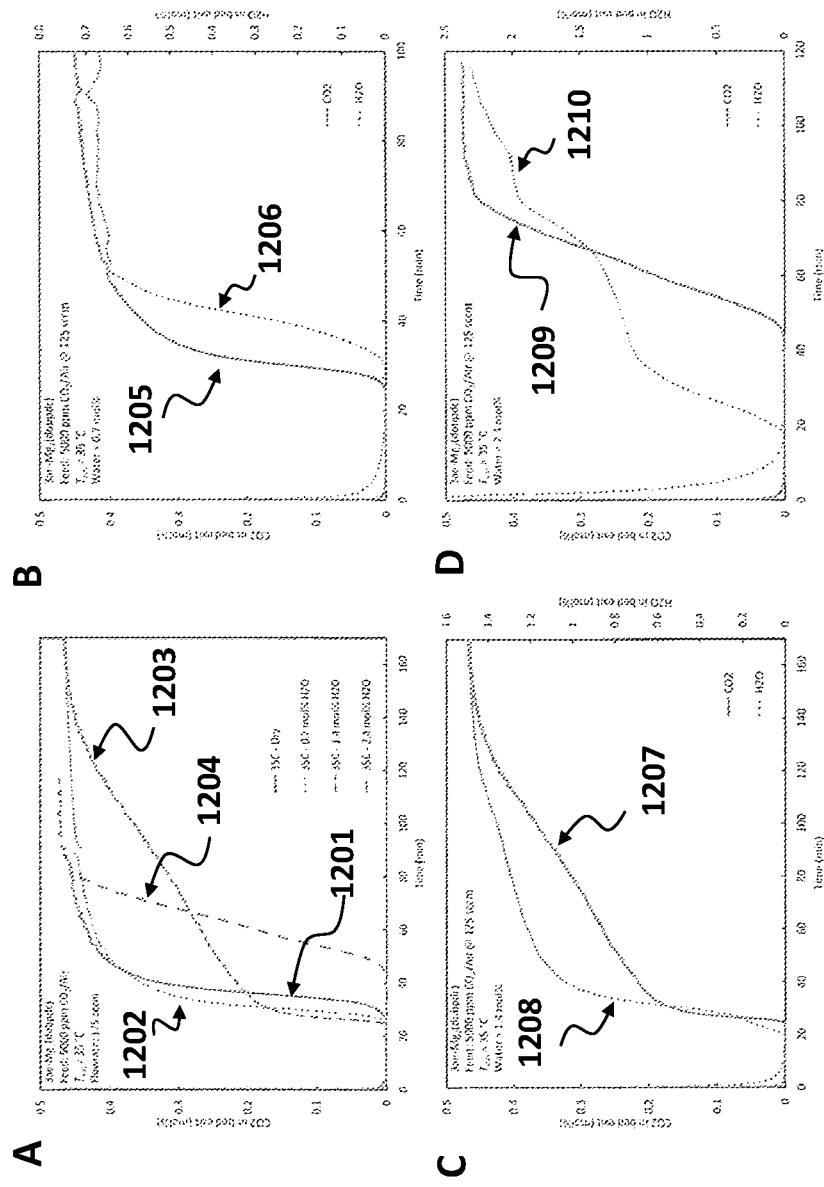
FIG. 12 (A-D) shows a representative plot of dynamic gas breakthrough of 5000 ppm $CO_2$ in air on 3ae-$Mg_2$(dobpdc) at 35° C. with varying water levels.

FIG. 12 panel A shows one embodiment of the present disclosure illustrating dynamic gas breakthrough of 5000 ppm $CO_2$ in air on 3ae-$Mg_2$(dobpdc) at a higher column temperature 35° C. with varying water levels corresponding to none (dry, trace 1201) to 0.7 mol % $H_2O$ (trace 1202), 1.4 mol % $H_2O$ (trace 1203) and at 2.4 mol % $H_2O$ (trace 1204). Panels B, C and D show the corresponding breakthrough times of carbon dioxide (1205, 1207 and 1209) and water (1206, 1208 and 1210) at the approximately equivalent water levels shown in Panel A, respectively.

TABLE 3

Results of $CO_2$ and water capacities for dry and humid dynamic gas breakthrough of 5000 ppm $CO_2$ in air on 3ae-$Mg_2$(dobpdc) at 35° C. with varying water levels along with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}$/ $v_{H2O}$ |
|---|---|---|---|---|---|
| 35° C. - dry | 2.25 | — | 0.29 | — | — |
| 35° C. - 0.7 mol % $H_2O$ | 2.00 | 3.29 | 0.32 | 0.27 | 1.2 |
| 35° C. - 1.4 mol % $H_2O$ | 3.43 | 7.84 | 0.19 | 0.25 | 0.78 |
| 35° C. - 2.4 mol % $H_2O$ | 3.60 | 13.75 | 0.18 | 0.23 | 0.76 |

Comparing results from Table 2 and Table 3 shows that the water adsorption is lower at 35° C. than 25° C. at equivalent inlet stream levels, however the carbon dioxide adsorption is relatively unchanged. As the water adsorption is reduced, it travels through the packed column of material faster, leading to complex carbon dioxide adsorption behavior and elution profiles. The importance of relative rates of propagation through the bed is more evident in this case—when water and carbon dioxide breakthrough simultaneously, a shock-wave profile is observed (see FIG. 12 Plot C). However, when the water is faster than the carbon dioxide a more traditional breakthrough performance is observed in FIG. 12 Plot D. Further increasing the adsorption temperature to 55° C. results in lower water co-adsorption and thereby a faster component velocity causing water to propagate down the test bed before carbon dioxide. This results in favorable carbon dioxide breakthrough profiles across all concentrations, while reporting significantly higher carbon dioxide capacities than the dry case.

Figure 13:
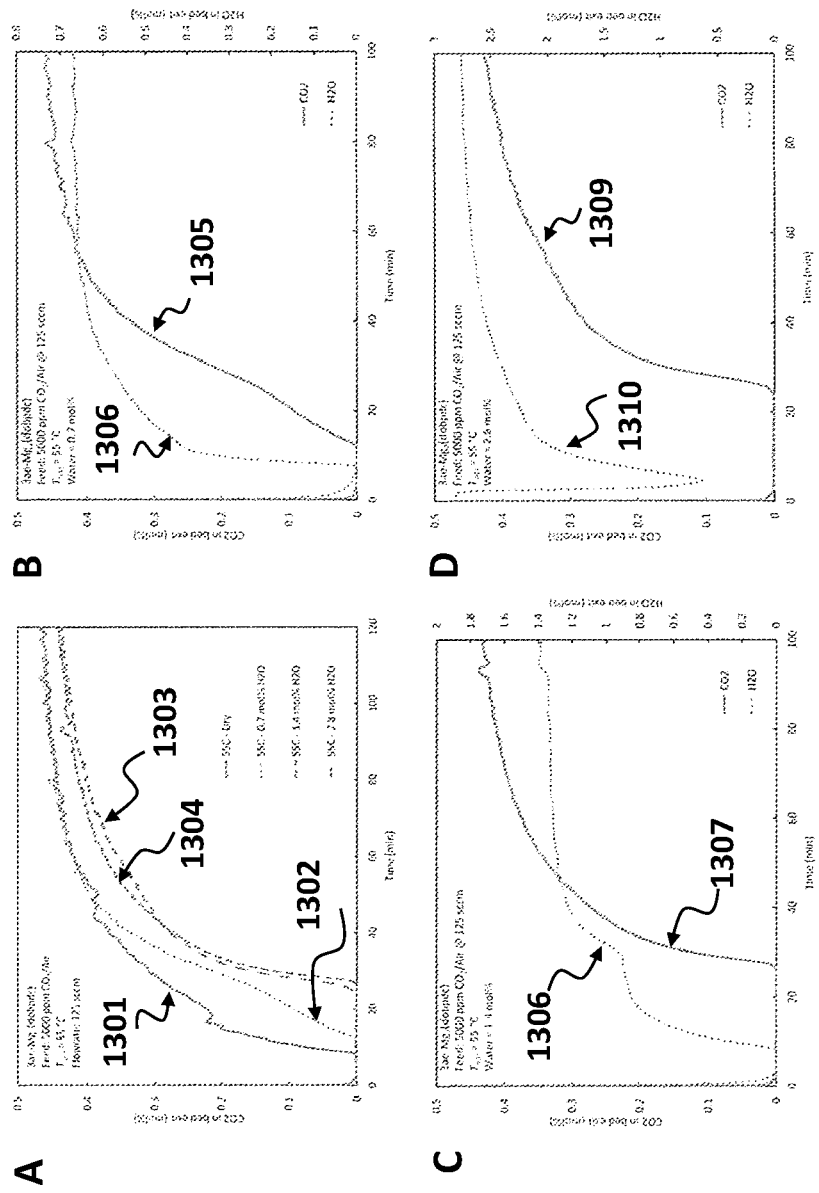
FIG. 13 (A-D) shows a representative plot of dynamic gas breakthrough of 5000 ppm $CO_2$ in air on 3ae-$Mg_2$(dobpdc) at 55° C. with varying water levels.

FIG. 13 panel A shows an embodiment of the present disclosure illustrating dynamic gas breakthrough of 5000 ppm $CO_2$ in air on 3ae-$Mg_2$(dobpdc) at 55° C. with varying water levels corresponding to none (dry, trace 1301) to 0.7 mol % $H_2O$ (trace 1302), 1.4 mol % $H_2O$ (trace 1304) and at 2.8 mol % $H_2O$ (trace 1303). Panels B, C and D show the corresponding breakthrough times of carbon dioxide (1305, 1307 and 1309) and water (1306, 1308 and 1310) at the approximately equivalent water levels shown in Panel A, respectively.

TABLE 4

Results of $CO_2$ and water capacities for dry and humid dynamic gas breakthrough of 5000 ppm $CO_2$ in air on 3ae-$Mg_2$(dobpdc) at 55° C. with varying water levels along with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}$/ $v_{H2O}$ |
|---|---|---|---|---|---|
| 55° C. - dry | 1.57 | — | 0.41 | — | — |
| 55° C. - 0.7 mol % $H_2O$ | 2.00 | 1.54 | 0.32 | 0.58 | 0.55 |
| 55° C. - 1.4 mol % $H_2O$ | 2.76 | 4.09 | 0.23 | 0.44 | 0.53 |
| 55° C. - 2.8 mol % $H_2O$ | 2.75 | 4.09 | 0.23 | 0.83 | 0.28 |

Performance Under Direct Air Capture

In addition, embodiments of the present invention where examined for efficacy under direct air capture conditions where ambient carbon dioxide concentrations are low, using about 400 ppm $CO_2$ in air with varying water content to explore the characteristics of the inventive method and materials as disclosed herein.

When designing a cyclic adsorption system to operate under a multicomponent stream, such as air, carbon dioxide and water, there are many factors in selecting the proper adsorbent and cycle conditions to allow for high capacity, cyclic performance. It is evident from the cases for removing carbon dioxide from an incident stream with 5000 ppm $CO_2$ that complex behavior for step-shaped adsorbents when simultaneously removing carbon dioxide and water. This complex behavior manifests itself in non-traditional elution profiles that are heavily dependent upon the relative rates (i.e., flow velocities) at which carbon dioxide and water propagate through the bed. Attractive carbon dioxide breakthrough profiles were achieved when water traveled through the bed faster than carbon dioxide when considering 5000 ppm $CO_2$ in air. Increased water velocities were achieved by increasing adsorption temperature (reducing water co-adsorption), increasing inlet water content or a combination of the two. These results suggest that in embodiments of the present disclosure wherein the water concentration is much higher than carbon dioxide (corresponding to a faster component velocity) favorable, deep carbon dioxide breakthrough performance can be attained. To probe this, similar experiments were performed at varying adsorption temperatures and water contents in an incident stream with ~400 ppm carbon dioxide, an order of magnitude lower than the previous cases explored herein above. Unlike the 5000 ppm $CO_2$ in air case (see FIG. 10), removing carbon dioxide from a 400 ppm $CO_2$ stream is highly dependent upon temperature as the concentration of the gas is much lower in partial pressure terms of the combined mixture of gases.

Figure 14:
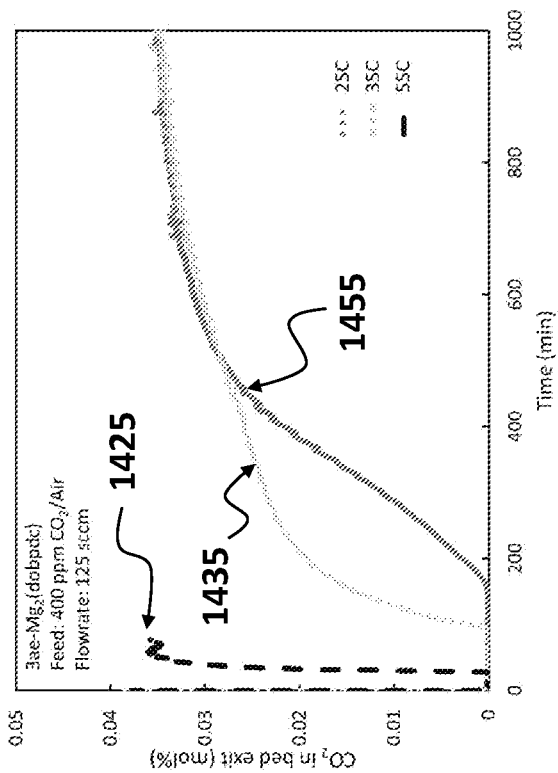
FIG. 14 shows a representative plot of dynamic gas breakthrough of dry 400 ppm $CO_2$ in air on 3ae-$Mg_2$(dobpdc) at different temperatures.

FIG. 14 shows an embodiment of the present disclosure illustrating dynamic gas breakthrough of dry 400 ppm $CO_2$ in air on 3ae-$Mg_2$(dobpdc) at different temperatures, including 25° C. (trace 1425), 35° C. (trace 1435) and at 55° C. (trace 1455).

Changes in adsorption temperature has marked impact on the resulting adsorption performance under dry conditions as shown in FIG. 14, which illustrates the effect of making small changes in step location as a function of temperature. Additionally, the profile of $CO_2$ exiting the test column is more spread out, compared to the more concentrated 5000 ppm $CO_2$ case indicating the kinetics of adsorption is related to the relative concentration of the adsorbate and is a significant factor when adsorbing carbon dioxide from a 400 ppm incident stream.

However, with the addition of water, or water vapor, carbon dioxide adsorption levels and dynamics of 3ae-$Mg_2$(dobpdc) are significantly improved under direct air capture conditions. Taking the case of adsorption at 25° C., the breakthrough profile (1425) is significantly sharpened across all the humidity levels evaluated, along with increased $CO_2$ capacities. While including water improves performance over the levels investigated, there are significant improvements in carbon dioxide capacity at water stream contents ≥1.5 mol % (corresponding to about 50% RH at 25° C.), reported in FIG. 15.

Figure 15:
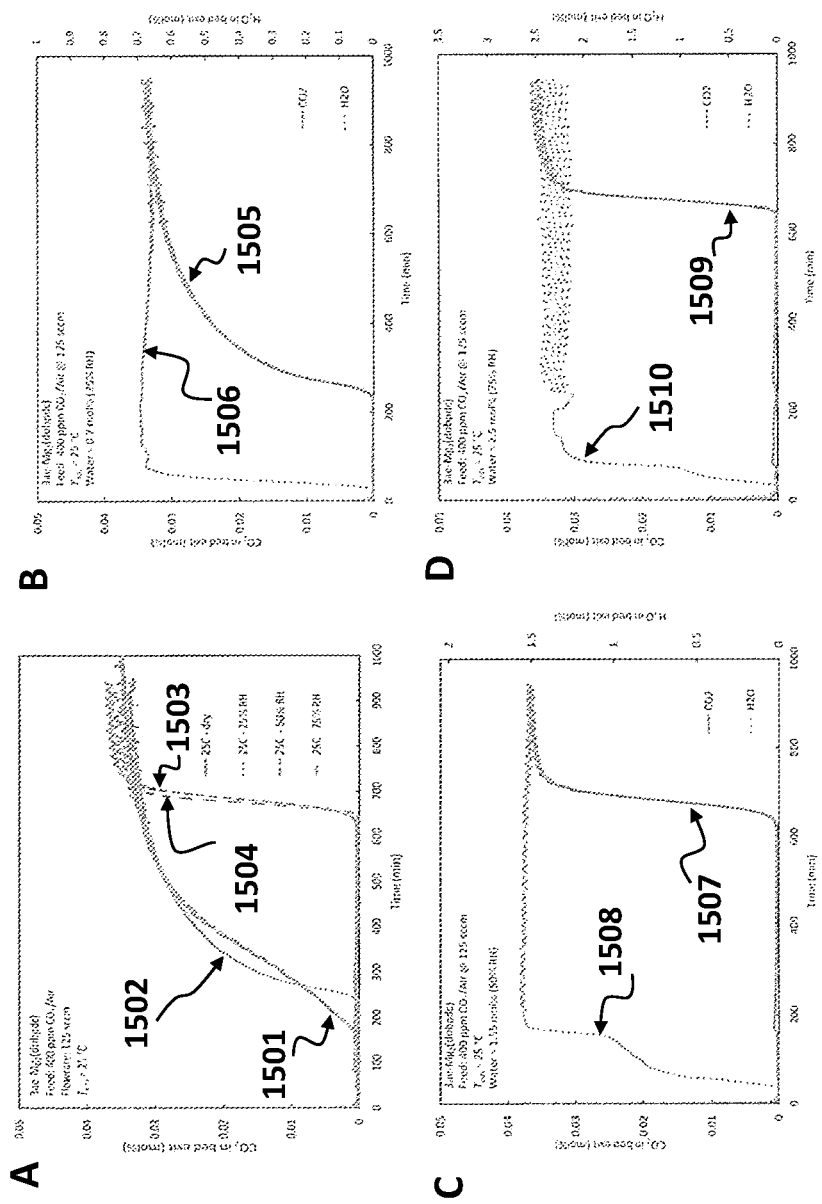
FIG. 15 (A-D) shows a representative plot of dynamic gas breakthrough of 400 ppm $CO_2$ in air on 3ae-$Mg_2$(dobpdc) at 25° C. with varying water levels.

Increasing from 1.5 to 2.5 mol % water results in minor increases in carbon dioxide adsorption capacity with a sharper elution profile, suggesting enhanced adsorption kinetics. The individual component breakthrough profiles recorded in FIG. 15 show that water travels through the bed much faster than carbon dioxide under direct air capture (DAC) conditions and is supported by the estimated component velocities reported in Table 5. These results corroborate the results with the 5000 ppm $CO_2$ in air experiments where favorable dynamic separation performance is attained when water (vapor) elutes faster than the carbon dioxide. Direct air capture (DAC) is a process of capturing carbon dioxide directly from the ambient air, as opposed to capturing from a flowing stream of gas or an effluent stream, for sequestration or utilization of the captured carbon dioxide.

FIG. 15 panel A shows embodiments of the present disclosure illustrating dynamic gas breakthrough of 400 ppm $CO_2$ in air on 3ae-$Mg_2$(dobpdc) at 25° C. with varying water levels corresponding to none (dry, trace 1501) to 25% RH (trace 1502), 50% RH (trace 1503) and 75% RH (trace 1504). Panels B, C and D show the corresponding breakthrough times of carbon dioxide (1505, 1507 and 1509) and water (1506, 1508 and 1510) at the approximately equivalent water levels shown in Panel A, respectively.

TABLE 5

Results of $CO_2$ and water capacities for dry and humid dynamic gas breakthrough of 400 ppm $CO_2$ in air on 3ae-$Mg_2$(dobpdc) at 25° C. with varying water levels along with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}$/ $v_{H2O}$ |
|---|---|---|---|---|---|
| 25° C. - dry | 1.9 | — | 0.027 | — | — |
| 25° C. - 0.7 mol % $H_2O$ | 2.35 | 13.88 | 0.022 | 0.065 | 0.34 |
| 25° C. - 1.5 mol % $H_2O$ | 2.97 | 16.2 | 0.017 | 0.12 | 0.14 |
| 25° C. - 2.5 mol % $H_2O$ | 3.15 | 20.94 | 0.016 | 0.14 | 0.11 |

Figure 16:
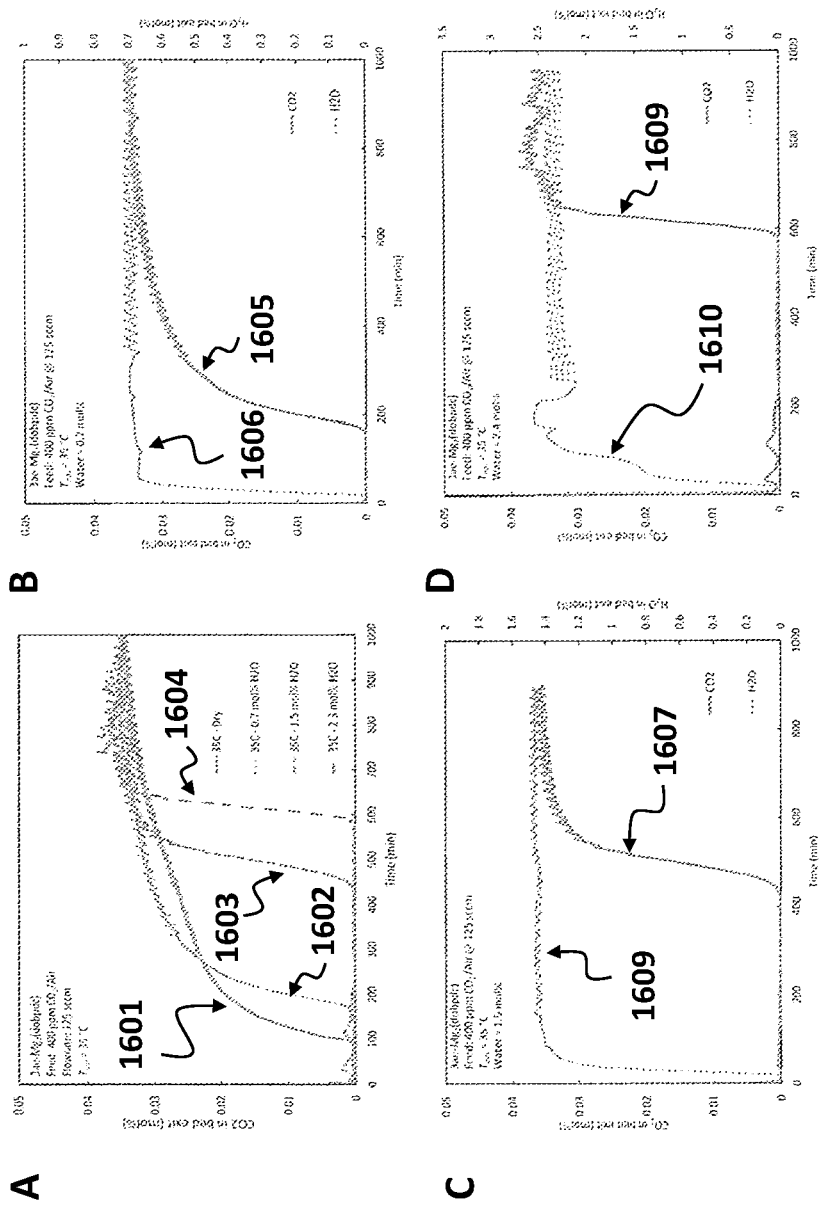
FIG. 16 (A-D) shows a representative plot of dynamic gas breakthrough of 400 ppm $CO_2$ in air on 3ae-$Mg_2$(dobpdc) at 35° C. with varying water levels.

Again, exploring the effect of Increasing the adsorption temperature from 25° C. to 35° C., the results show similar overall trends; with the addition of water carbon dioxide adsorption increases and the elution wave sharpens substantially as shown in FIG. 16. FIG. 16 shows embodiments of the present disclosure exhibiting dynamic gas breakthrough of 400 ppm $CO_2$ in air on 3ae-$Mg_2$(dobpdc) at 35° C. with varying water levels corresponding to dry (trace 1601), 0.7 mol % $H_2O$ (trace 1602), 1.5 mol % $H_2O$ (trace 1603) and 2.3 mol % $H_2O$ (trace 1604) (Panel A). Panels B, C and D show the corresponding breakthrough times of carbon dioxide (1605, 1607 and 1609) and water (1606, 1608 and 1610) at the approximately equivalent water levels shown in Panel A, respectively, at the intermediate 35° C. column temperature.

The water adsorption capacity is significantly reduced under the elevated temperature, with the 35° C. case reporting 39% reduction in adsorbed water at the highest humidity level tested (see Table 6, from 20.9 to 12.7 mmol $H_2O$/g adsorbent). This is almost double the 19% $CO_2$ reduction (from 3.15 to 2.56 mmol $CO_2$/g adsorbent) obtained at 25° C., demonstrating the differing temperature dependencies of adsorption of water and carbon dioxide by embodiments of the present disclosure.

TABLE 6

Results of $CO_2$ and water capacities for dry and humid dynamic gas breakthrough of 400 ppm $CO_2$ in air on 3ae-$Mg_2$(dobpdc) at 35° C. with varying water levels along with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}$/ $v_{H2O}$ |
|---|---|---|---|---|---|
| 35° C. - dry | 1.57 | — | 0.033 | — | — |
| 35° C. - 0.7 mol % $H_2O$ | 1.38 | 5.75 | 0.037 | 0.16 | 0.23 |
| 35° C. - 1.5 mol % $H_2O$ | 2.28 | 11.72 | 0.022 | 0.16 | 0.14 |
| 35° C. - 2.4 mol % $H_2O$ | 2.56 | 12.66 | 0.020 | 0.23 | 0.09 |

Figure 17:
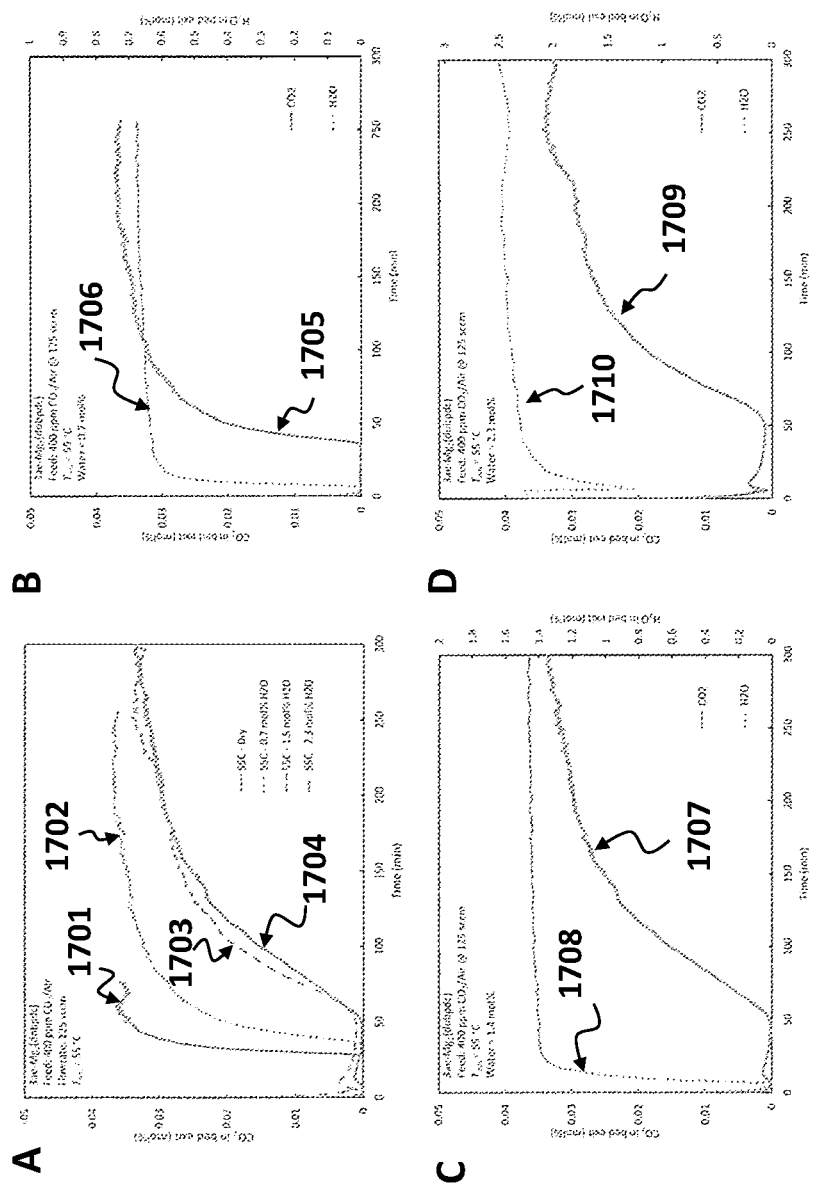
FIG. 17 (A-D) shows a representative plot of dynamic gas breakthrough of 400 ppm $CO_2$ in air on 3ae-$Mg_2$(dobpdc) at 55° ° C. with varying water levels.

Increasing the adsorption temperature further to 55° C. shows that added humidity can enhance carbon dioxide; adsorption performance, but not to the same levels as the lower temperatures. This is due to the shifting the step for carbon dioxide adsorption to a higher pressure as temperature increases, reducing the available capacity under a 400 ppm $CO_2$ stream. However, examination of the equilibrium isotherms for 3ae-$Mg_2$(dobpdc) shown in FIG. 10, the material should effectively display no carbon dioxide adsorption under a 400 ppm $CO_2$ incident stream. Nevertheless, results from dynamic breakthrough experiments at 55° C. shown in FIG. 17 demonstrate otherwise; there is, surprisingly, an appreciable amount of carbon dioxide adsorption, relative to predicted performance. FIG. 17 panel A shows an embodiment of the present disclosure exhibiting dynamic gas breakthrough of 400 ppm $CO_2$ in air on 3ae-$Mg_2$(dobpdc) at 55° C. with varying water levels. Panels B, C and D show the corresponding breakthrough times of carbon dioxide (1705, 1707 and 1709) and water (1706, 1708 and 1710) at the approximately equivalent water levels shown in Panel A, respectively, at the higher 55° C. column temperature.

Furthermore, like the conditions experienced under adsorption at 25° C., there is a critical threshold level of humidity that enhances performance. Further increasing the water content from 1.4 to 2.3 mol % has a negative impact on the carbon dioxide adsorption performance, assumed to be the competition of adsorption sites at the higher temperature as a result of the location of the carbon dioxide adsorption step. The higher temperature adsorption displays reduced separation dynamics with increased water content, contrary to the results shown at lower adsorption temperatures, wherein increasing water content led to sharper carbon dioxide elution profiles.

TABLE 7

Results of $CO_2$ and water capacities for dry and humid dynamic gas breakthrough of 400 ppm $CO_2$ in air on 3ae-$Mg_2$(dobpdc) at 55° C. with varying water levels along with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}$/ $v_{H2O}$ |
|---|---|---|---|---|---|
| 55° C. - dry | 0.15 | — | 0.34 | — | — |
| 55° C. - 0.7 mol % $H_2O$ | 0.27 | 1.16 | 0.19 | 0.77 | 0.24 |
| 55° C. - 1.4 mol % $H_2O$ | 0.67 | 3.07 | 0.077 | 0.63 | 0.12 |
| 55° C. - 2.3 mol % $H_2O$ | 0.55 | 3.68 | 0.093 | 0.80 | 0.12 |

Applications to Cyclic Adsorption Processes

Figure 18:
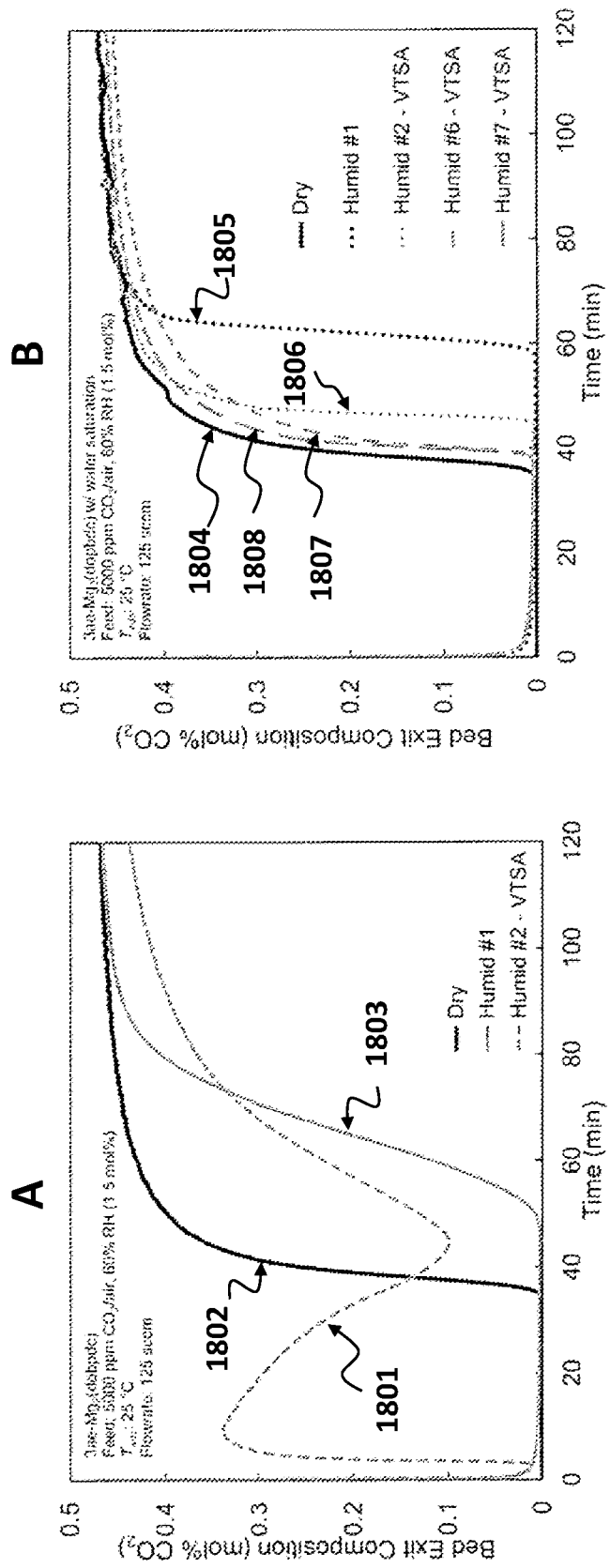
FIG. 18. (A-B) shows a representative plot of cyclic, dynamic gas breakthrough of humid 5000 ppm $CO_2$ in air on 3ae-$Mg_2$(dobpdc) at 25° C. without (A) and with (B) water pre-saturation.

Controlling adsorption with adsorbent pre-conditioning while using single-pass techniques and measurements are useful for material screening, however performance under cyclic conditions is the true measure of the utility for an adsorbent for carbon dioxide removal in any practical application where the material has to be reused or regenerated for subsequent and continuous use for scale and economy. To address this, small columns of MOF adsorbent were subject to cyclic performance, activating samples under simulated process-relevant conditions to evaluate performance. The left panel A of FIG. 18 shows the performance of 3ae-$Mg_2$(dobpdc) under a humid 5000 ppm $CO_2$ in air stream before and after a vacuum-temperature swing adsorption (VTSA) cycle, where the adsorbent was regenerated by heating to 93° C. under 0.5 psi (pounds per square inch) active vacuum. The trace 1802 represents a dry incident stream compared to a humid stream represented by traces 1803 performed without prior regeneration, and trace 1801 ("Humid #2-VTSA") which shows the dynamic $CO_2$ performance when the humid incident stream is introduced directly after regeneration without any pre-conditioning. The resulting complex carbon dioxide breakthrough profile suggests competing adsorption of $CO_2$ and $H_2O$ as both travel down the bed at a similar velocity. This performance is undesirable, as a considerable amount of carbon dioxide passes through the column, resulting in decreased capture efficiency under these conditions. This is consistent with conditions reported in Table 2 and FIG. 11, where complex behavior is seen when the carbon dioxide travels faster than water.

FIG. 18 shows embodiments of the present disclosure exhibiting cyclic, dynamic gas breakthrough of humid 5000 ppm $CO_2$ in air on 3ae-$Mg_2$(dobpdc) at 25° C. without (panel A) and with water pre-saturation (panel B). In panel B, trace 1804 corresponds to a dry incident stream, while trace 1805 corresponds to a first pass with water saturation of the MOF without regeneration, and subsequent traces 1806, 1807 and 1808 correspond to subsequent passes with water saturation of the MOF after multiple regeneration steps using VTSA have been completed.

Accordingly, the results shown in the right panel B of FIG. 18 show surprisingly that deep carbon dioxide removal is achievable given addition of a simple process step during the cycle-pre-saturation of the column with water. This removes the competition that occurs when carbon dioxide and water are traveling at similar velocities down the bed, resulting in repeatable, deep carbon dioxide removal from dilute streams of $CO_2$. Therefore, under conditions where the carbon dioxide travels faster than water and the adsorption temperature cannot be altered to a higher condition to reduce water adsorption, for example increasing to 35° C., the following steps can be used to ensure deep, repeatable carbon dioxide removal from dilute (up to around 1% $CO_2$) concentrations:

1. Adsorb carbon dioxide from humid stream;
2. Regenerate adsorbent under specified conditions to release carbon dioxide and water;
3. Flow humid air (or other humid, non-$CO_2$ laden stream) over the bed to saturate with water; and
4. Repeat process steps 1-3 until acceptable extraction has been achieved.

Controlling Adsorption Through Gas Dilution

While 3ae-$Mg_2$(dobpdc) required pre-saturation with water for deep removal under a 5000 ppm $CO_2$ in air stream during simulated cyclic operation, this requirement was not observed for i2-$Mg_2$(dobpdc) under more dilute carbon dioxide streams.

Figure 19:
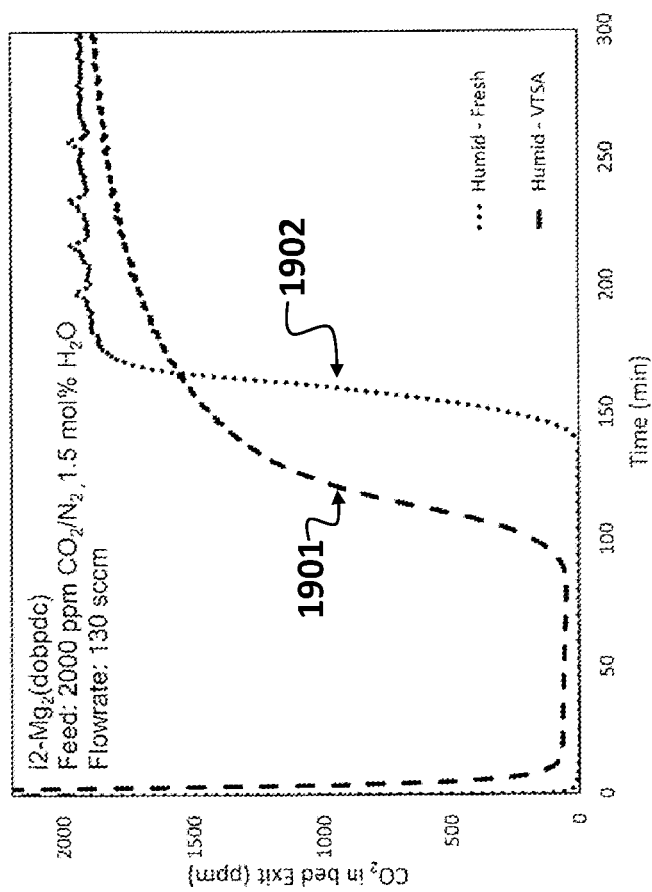
FIG. 19 shows a representative plot of cyclic, dynamic gas breakthrough of humid 2000 ppm $CO_2$ in $N_2$ on i2-$Mg_2$(dobpdc) at 25° C. after fresh activation and simulated VTSA regeneration under flowing 6000 ppm $CO_2$ in $N_2$ while heating to 85° C.

FIG. 19 shows further embodiments of the inventive disclosure exhibiting cyclic, dynamic gas breakthrough of humid 2000 ppm $CO_2$ in $N_2$; on i2-$Mg_2$(dobpdc) at 25° C. after fresh activation and simulated VTSA regeneration under flowing 6000 ppm $CO_2$ in $N_2$ (equivalent to 6 mbar $CO_2$ partial pressure) while heating to 85° C. FIG. 19 shows simulated cyclic performance of i2-$Mg_2$(dobpdc) for removing carbon dioxide from a humid stream of $CO_2$ in $N_2$, comparing the "fresh" performance (trace 1902) representative of material after VTSA activation under flowing $N_2$ heated to 150° C., indicative of the highest performance achievable under these conditions. After saturation, the adsorbent was heated under a dry, flowing stream of 6000 ppm $CO_2$ in $N_2$ to 85° C., simulating regeneration conditions for a specific life support system. Exposing the regenerated column of i2-$Mg_2$(dobpdc) to a humid stream of 2000 ppm $CO_2$ in $N_2$, without water pre-saturation, results in the "VTSA" performance (trace 1901) as reported in FIG. 19 with adsorption capacities and estimated component velocities reported in Table 8 hereinbelow.

TABLE 8

Results of $CO_2$ and water capacities for humid dynamic gas breakthrough of 2000 ppm $CO_2$ in $N_2$; on i2-$Mg_2$(dobpdc) at 25° C. with estimated pure component bed velocities during dynamic adsorption.

| Condition | mmol $CO_2$/ g MOF | mmol $H_2O$/ g MOF | $v_{CO2}$ (cm/min) | $v_{H2O}$ (cm/min) | $v_{CO2}$/ $v_{H2O}$ |
|---|---|---|---|---|---|
| Humid - Fresh | 3.36 | 15.4 | 0.08 | 0.14 | 0.57 |
| Humid - VTSA | 2.54 | 13.1 | 0.11 | 0.16 | 0.64 |

The deep removal of carbon dioxide after VTSA regeneration, without the need for water pre-condition is advantageous as it reduces the number of steps required during an adsorption process. Considering the estimated carbon dioxide and water velocities reported in Table 8, and the results from the 5000 ppm cases examined above, achieving a carbon dioxide/water velocity ratio of less than about <0.7:1 results in favorable adsorption performance.

Figure 20:
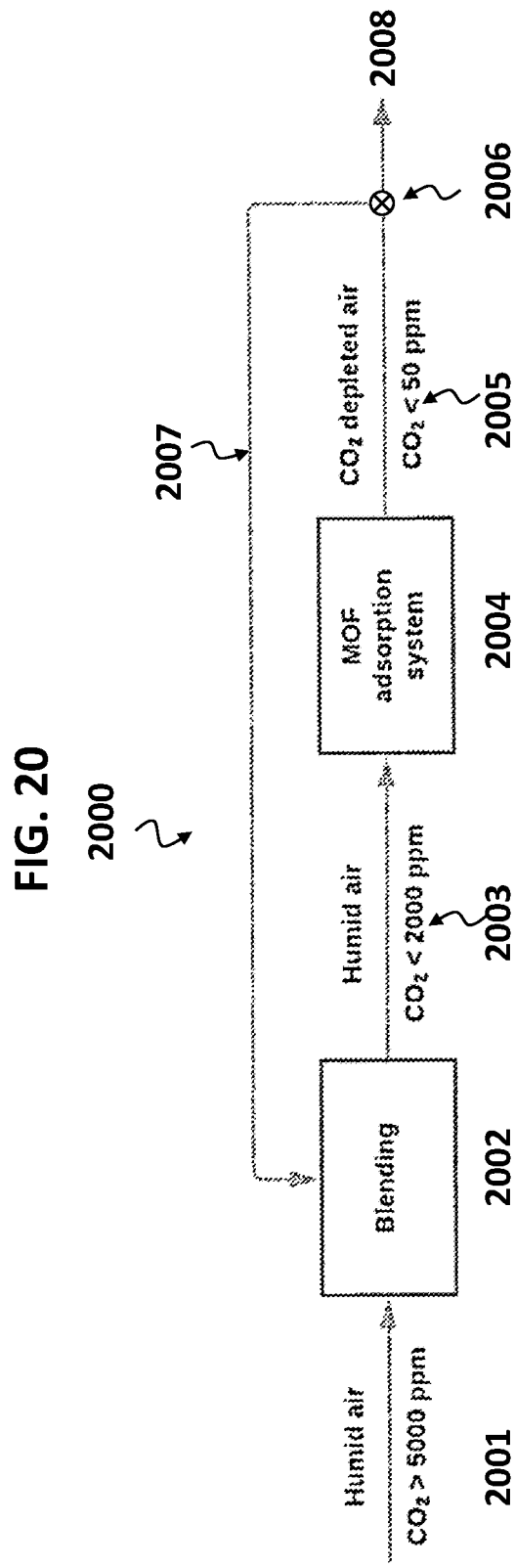
FIG. 20 shows a schematic of one embodiment of a gas blending process for reducing $CO_2$ content to achieve superior removal with diamine-appended MOF adsorbents.

FIG. 20 shows one embodiment of an inventive gas blending process for reducing carbon dioxide content to enable deep removal with diamine-appended MOF adsorbents employing humidity as a functional control parameter to radically improve carbon dioxide retention without the need for preconditioning of the MOF column. In one embodiment of the present disclosure, one method for changing the relative component velocities is to blend $CO_2$-depleted gas (2005), exiting the adsorbent bed (using diverting valve 2006) with the incoming gas to be treated (2001) as shown in one representative embodiment of the present disclosure schematically in FIG. 20. By diverting a fraction of the processed air ($CO_2$ lean, 2007) from the adsorption system 2004 and blending (2002) with the incoming gas (2001) of a higher $CO_2$ concentration results in higher incident humidity levels (flow input 2003) to the MOF adsorption system (2004), producing a desirable intermediate $CO_2$ level that exhibits improved velocity through the adsorption system, enabling repeatable, deep carbon dioxide removal from the final effluent stream (2008).

Humidity Enabled Carbon Dioxide Adsorption

Figure 21:
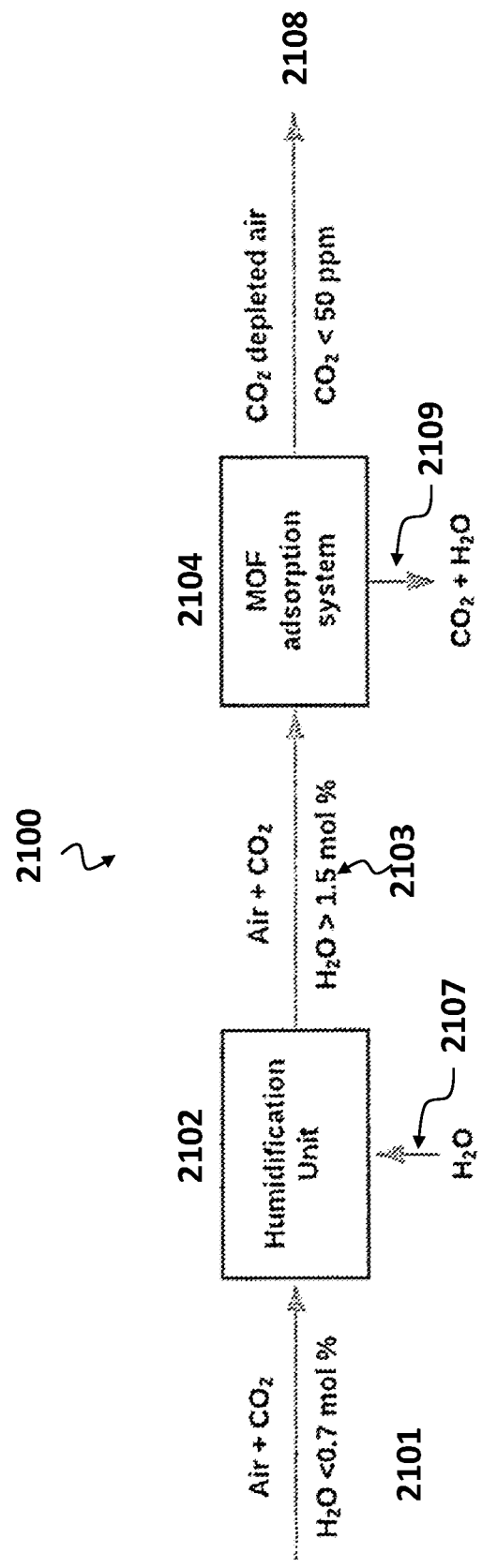
FIG. 21 shows a schematic of one embodiment of a two-step process for controlling dilute $CO_2$ removal from low humidity streams with step-shaped MOF adsorbents.

Considering that humidity in both atmospheric air and confined spaces can fluctuate depending upon a variety of factors, there can be widespread variation in water contents of streams to remove the carbon dioxide therefrom. Taking the results outlined above, there seems to be threshold humidity level that result in water-enhanced carbon dioxide adsorption with step-shaped adsorbents (see FIG. 12 and FIG. 15). Therefore, increasing the water content of the incoming stream with a humidification system, prior to carbon dioxide removal, will enable higher carbon dioxide capacities. This configuration will enable smaller quantities of adsorbent to be used for a given carbon dioxide removal rate, compared to a non-water enhanced system. A schematic outlining this conceptual two-stage process is shown in FIG. 21. A concrete example of this is easily drawn from FIG. 15 panel B and panel C, where increasing the water content in the stream leads to a >25% increase in carbon dioxide capacity.

FIG. 21 shows one embodiment of the present disclosure illustrating schematically a two-step process and system (2100) for controlling dilute carbon dioxide removal from low humidity streams with step-shaped performing MOF adsorbents. In this embodiment, the separation of carbon dioxide from a low ambient humidity feed stream 2101 is augmented by injecting water (2107) into a humidification unit (2102) to increase the % RH to greater than or equal to about 1.5 mol % $H_2O$ in the resulting upstream flow (2103) prior to passing through the MOF adsorption system 2104, resulting in deeply reduced $CO_2$ content air (2108) with less than about 50 ppm carbon dioxide present as the resulting effluent (2108) from the system 2100. During the process, excessive carbon dioxide and water (2109) can be removed/recycled from the MOF adsorption system (2104) and water optionally recovered for re-injection (2107) to the humidification unit (2102) if desired.

Broader Applicability

As described above in various embodiments of the present disclosure, there are several methods where humidity and carbon dioxide concentration can used to control adsorption performance of diamine-appended MOFs that display step-shaped $CO_2$ isotherms. While a small set of diamines were presented here, these trends are expected to hold across the entire family of diamine-appended MOFs (diamine-base MOF combinations) that result in step-shaped $CO_2$ adsorption isotherms. While three definitive examples of dilute $CO_2$ (5000, 2000 and 400 ppm) concentrations were considered and explored herein, the trends are expected to hold across a wide range of carbon dioxide concentrations, from about 10 ppm to 10,000 ppm (0.0001-1%) for dilute carbon dioxide contents, and applicable to even higher carbon dioxide concentrations found in industrial gas separations in excess of 1%. The concepts and embodiments of the disclosure presented herein show that controlling relative carbon dioxide and water adsorption, and thereby the relative velocities of these otherwise competing components through a treatment bed can significantly impact the ultimate performance of $CO_2$-selective adsorbents with step-shaped isotherms. Furthermore, while reduced to practice in small-scale packed columns with high (>3) length/diameter ratios common to traditional fixed-bed, cyclic adsorption systems, this method for controlling adsorbent behavior will be independent of ultimate use form-factor. Without being bound by theory, it is believed that the same performance attributes will hold for alternative adsorbent bed configurations including, but not limited to, radial, rectangular, stacked plates, and configurations with and without integrated heat management components (coils, fins, etc.), as humidity and carbon dioxide level control appears to be the dominate factor in optimizing performance and is not dependent on geometrical column variations.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more."

All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present disclosure. Furthermore, no element, component, or method step in the present disclosure is intended to be dedicated to the public regardless of whether the element, component, or method step is explicitly recited in subsequent claims.

The invention claimed is:

1. A method for removing $CO_2$ from an effluent gas stream, the method comprising:
    (a) contacting the effluent gas stream with an adsorption material located within an adsorption system to reversibly adsorb $CO_2$ from said effluent gas stream thereby generating an adsorption material with improved $CO_2$ capacity;
    wherein said adsorption material is an amine-functionalized solid sorbent comprising an amine-appended metal-organic framework composed of a plurality of
        (i) amine-containing ligands;
        (ii) polytopic organic linkers; and
        (iii) metal ions;
        wherein said amine-functionalized solid sorbent is present in the form of a packed bed of solids selected from particles, granules, agglomerates thereof, and combinations thereof;
        wherein said improved $CO_2$ capacity is achieved by means of pre-saturating said adsorption material using water vapor prior to contact with said effluent gas stream;
    (b) removing a major portion of the $CO_2$ from said effluent gas stream to generate a treated effluent gas stream exiting said adsorption system; and
    (c) retaining said major portion of said $CO_2$ on said amine-functionalized solid sorbent prior to a regeneration process to renew said adsorption material;

wherein said means of pre-saturating said adsorption material is achieved by means of a humidification unit that functions to control the amount of water present within said adsorption material, and wherein the method further comprises measuring a relative humidity level of the treated effluent gas stream exiting the adsorption system to obtain a measured relative humidity of the treated effluent gas stream; and based on the measured relative humidity of the treated effluent gas stream, changing the temperature of the incoming effluent gas stream, changing the velocity of said incoming effluent gas stream, or changing the temperature of the adsorption material to maintain a humidity level within said adsorption material at an optimum level during usage, and wherein the optimum level in the adsorption material is a relative humidity with respect to water present on said amine-functionalized solid sorbent, and the optimum level corresponds to between 1.5 and 3.5 mole percent $H_2O$.

2. The method of claim 1, wherein the amine-containing ligands are selected from diamines, triamines, tetraamines, polyamines, and amine-alcohols.

3. The method of claim 1, wherein the amine-containing ligands are selected from ethylene diamine, N-methylethylenediamine, N-ethylethylenediamine, N,N-dimethylethylenediamine, N,N-diethylethylenediamine, di(N-methyl)ethylene diamine, N-isopropylethylenediamine, N,N-dimethyl-N-methylethylenediamine, di(N,N-dimethyl)ethylenediamine, N,N-diisopropylethylenediamine, 2,2-dimethyl-1,3-diaminopropane, 1,3-diaminopentane, diethylenetriamine, N-(2-aminoethyl)-1,3-propanediamine, bis(3-aminopropyl)amine, N-(3-aminopropyl)-1,4-diaminobutane, triethylenetetramine, N,N'-bis(2-aminoethyl)-1,3-propanediamine, 1,2-bis(3-aminopropylamino)ethane, N,N'-bis(3-aminopropyl)-1,3-propanediamine, N,N'-bis(3-aminopropyl)-1,4-diaminobutane, tetraethylenepentamine, and combinations thereof.

4. The method of claim 1, wherein said humidity level within said adsorption material is maintained at an optimum level during usage by continuously monitoring the relative humidity level of the treated effluent gas stream exiting said adsorption system and adjusting said humidity level within said adsorption material to said optimum level by changing the temperature of the adsorption material.

5. The method of claim 1, wherein said adsorption material is synthesized by a method comprising grafting a plurality of said amine-containing ligands onto a metal-organic framework, wherein the metal-organic framework comprises a plurality of metal cations and a plurality of polytopic organic linkers, wherein the grafting comprises exposing an amount of the metal-organic framework to a solution comprising the polyamine amine-containing ligands diluted with a solvent thereby forming an unactivated adsorption material.

6. The method of claim 1, wherein
said diamine-containing ligands are selected from ethylene diamine, N-methylethylenediamine, N-ethylethylenediamine, N,N-dimethylethylenediamine, N,N-diethylethylenediamine, di(N-methyl)ethylenediamine, N-isopropylethylenediamine, N,N-dimethyl-N-methylethylenediamine, di(N,N-dimethyl)ethylenediamine, N,N-diisopropylethylenediamine, 2,2-dimethyl-1,3-diaminopropane, 1,3-diaminopentane, and combinations thereof;

wherein said polytopic organic linker is selected from 4,4'-dihydroxy-(1,1'-biphenyl)-3,3'-dicarboxylic acid, its deprotonated mono-carboxylate form, its di-carboxylate form, and combinations thereof; and wherein said metal ions are cationic metal ions selected from Mg, Ca, Mn, Cr, Fe, Co, Ni, Cu, Zn, and combinations thereof.

7. The method of claim 6,
wherein said adsorption material is saturated by the continuous introduction of water to said adsorption material in the form of water vapor introduced by means of injecting said water vapor into said effluent gas stream prior to contact with said adsorption material to achieve a higher relative humidity level than the effluent gas stream prior to said injection of water;

wherein said means of injecting said water vapor is achieved by use of said humidification unit; and wherein said humidification unit is located between the source of said effluent gas stream and said adsorption system.

8. The method of claim 6, wherein said adsorption material is pre-saturated by first introducing water to an unactivated adsorption material in the form of water vapor introduced by means of first exposing said adsorption material to a neutral carrier gas containing water vapor to produce an activated adsorption material prior to exposing said activated adsorption material to said effluent gas stream.

9. The method according to claim 8, wherein said adsorption material is regenerated in a repeatable cyclic process comprising the steps of (a) adsorbing $CO_2$ from either an effluent gas stream or gaseous environment;

(b) regenerating said adsorbent material using at least one step of applying heat to said adsorbent material, heating the effluent gas stream, heating an inert gas stream, applying vacuum to said adsorbent material, or combinations thereof to release adsorbed carbon dioxide and water;

(c) flowing an inert gas stream containing water vapor over said adsorption material or contacting said adsorption material with water, water vapor or combinations thereof to achieve an optimum level of relative humidity; and (d) repeating steps (a)-(c) until acceptable extraction has been achieved.

10. The method of claim 8, wherein said step of pre-saturating said adsorption material using water vapor by means of a humidification unit prior to contacting with the effluent gas stream results in an activated adsorption material exhibiting at least one improvement in performance relative to said unactivated adsorption material wherein said improvement is selected from (i) an increased $CO_2$ capacity, (ii) increased gas velocity at constant $CO_2$ capacity, (iii) depth of $CO_2$ adsorption, and combinations thereof.

11. The method of claim 10, wherein said at least one improvement in performance relative to said unactivated adsorption material is achieved by maintaining the humidity level within said adsorption material to the optimum level during dynamic contact with said effluent gas stream.

* * * * *